United States Patent

Flaczynski

[15] 3,682,554
[45] Aug. 8, 1972

[54] NON-CONTACT MEASUREMENT METHOD AND APPARATUS

[72] Inventor: Lawrence F. Flaczynski, Columbus, Ohio

[73] Assignee: Reliance Electric Company, Cleveland, Ohio

[22] Filed: June 19, 1970

[21] Appl. No.: 47,669

[52] U.S. Cl. ............356/167, 250/219 LG, 250/223
[51] Int. Cl. .............................................G01b 11/00
[58] Field of Search .........356/167; 250/219 LG, 223

[56] References Cited

UNITED STATES PATENTS

| | | | |
|---|---|---|---|
| 3,061,732 | 10/1962 | Milnes | 250/219 LG |
| 3,159,749 | 12/1964 | Dalrymple et al. | 356/167 |
| 3,365,699 | 1/1968 | Foster | 356/167 |
| 2,941,086 | 6/1960 | Gottschall et al. | 356/167 |
| 3,060,791 | 10/1962 | Tarczy-Hornoch | 250/219 LG |
| 2,989,690 | 6/1961 | Cook | 250/219 LG |
| 2,655,994 | 10/1953 | Vandenberg | 250/219 LG |
| 3,428,817 | 7/1969 | Hofmeister et al. | 250/219 LG |
| 3,180,995 | 4/1965 | Briggs et al. | 356/167 |

Primary Examiner—Ronald L. Wibert
Assistant Examiner—Jeff Rothenberg
Attorney—Le Blanc & Shur

[57] ABSTRACT

Disclosed is a technique for non-contact measurement of objects on a moving conveyor. A light source establishes upstream and downstream light beams across the path of motion of the conveyor to define a measuring zone. Optical sensors and associated circuitry provide a dimension analog of the duration of a deviation time interval between interception of the leading edge of an object with the downstream light beam and the interception of the trailing edge of the object with the upstream light beam. Conveyor velocity analog is generated by providing a sequence of markers equally spaced along the conveyor and timing the passage of successive markers at a predetermined point. Measurement is provided in terms of the ratio of the dimension analog and the velocity analog. To facilitate measurement of transparent objects such as glass or plastic bottles, the gauging circuitry is so constructed as to be rendered inoperative except during a short gauging interval embracing the deviation time interval. A new gauging interval is initiated in response to passage of each marker at the predetermined location.

32 Claims, 22 Drawing Figures

INVENTOR
LAWRENCE F. FLACZYNSKI

BY *Le Blanc & Shur*

ATTORNEYS

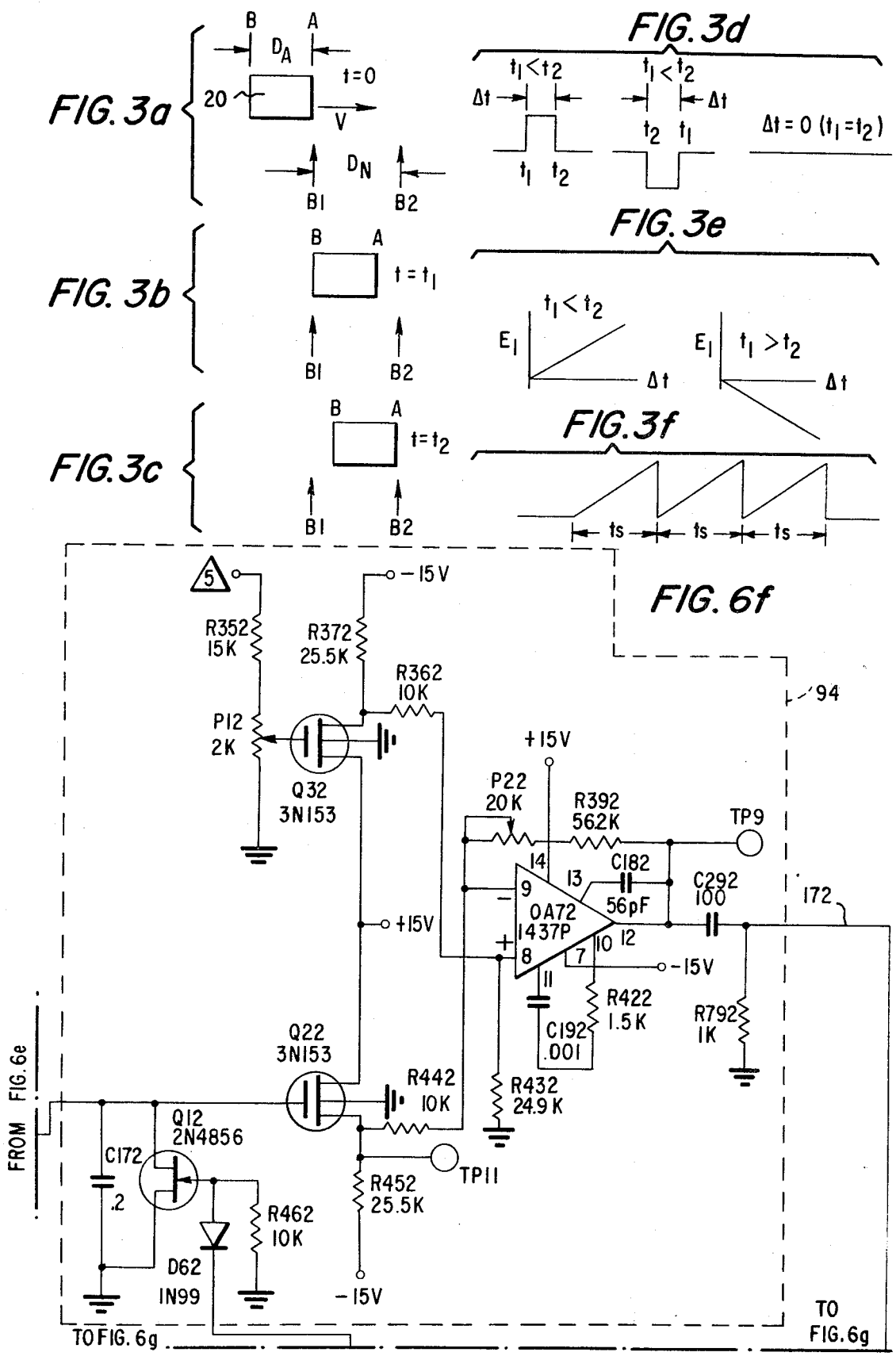

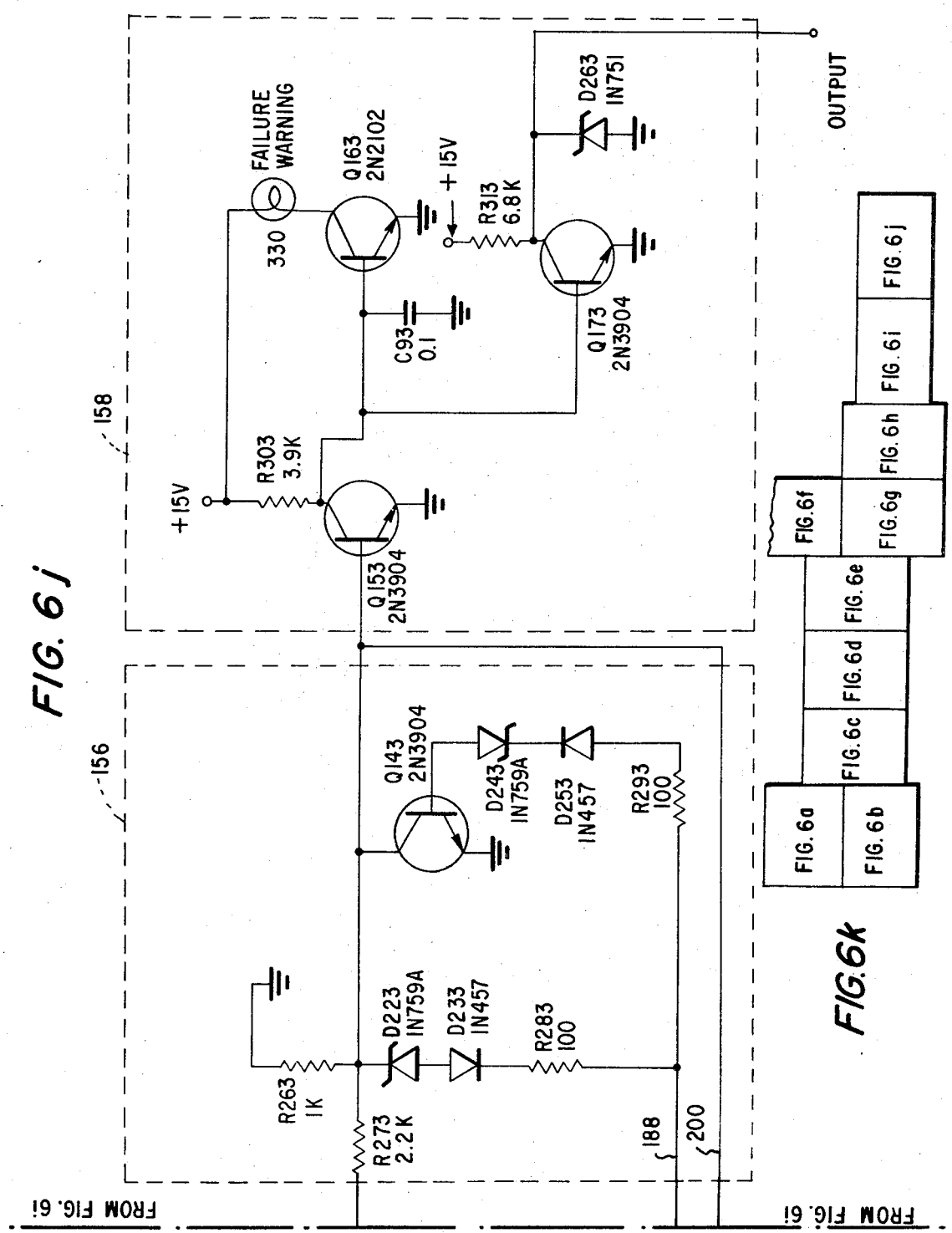

NON-CONTACT MEASUREMENT METHOD AND APPARATUS

This invention relates to a method and apparatus for non-contact production line measurement of external dimensions of a sequence of items on a rapidly moving conveyor.

Broadly stated, measurement is accomplished by timing the passage of the objects under inspection through a measuring zone defined by "upstream" and "downstream" energy beams such as light beams. Even optically transparent objects may be measured in this way by actuating the measuring equipment only for short gauging intervals during which the presence of the objects under inspection in the measuring zone is anticipated.

To account for variation in velocity of the objects being measured, a velocity measurement is made by determining the time required for movement of the conveyor carrying the objects through a predetermined distance. Particular advantages of the invention are the capability for high accuracy measurement even of small, closely spaced, rapidly moving objects, and capability for measurement of objects which are highly transparent to the form of energy defining the measuring zone.

Devices of several types are available for non-contact dimension gauging, and some have been adapted for measurement of items passing along a production line. However, difficulties are encountered where the objects under inspection are quite small and must be measured with a high degree of accuracy, and also where the items under inspection move rapidly past the inspection station. For such applications, heretofore available devices, have not produced completely satisfactory results.

Consider, for example, the need for production line measurement of the external dimensions of bottles or similar transparent objects produced by a high volume automatic molding operation. In one such operation, glass bottles may be produced by a high speed automatic blow molding process at the rate of 10 to 20 bottles per second. The bottles have a nominal outside diameter of 2.500 inches and must be measured to within ±0.002 inch. The bottles may leave a processing station on a conveyor with an "on-center" spacing of about five inches, and will pass a measuring station along the conveyor at a velocity of between about 4 and 8 feet per second.

As will be appreciated from the foregoing, such an application imposes quite severe demands. Obviously, contact measurement is infeasible in view of the speed of the articles, while non-contact measurement is hindered by the fact that capacitive or inductive sensing of materials such as glass or plastic is infeasible. Optical measurement is hindered by the transparency of the material. If the bottle is still at a high temperature at the time of measurement, infra-red, and even optical radiation from the bottle (which would be essentially non-directional) could seriously affect the accuracy of measurement.

As an additional consideration, non-contact measurement involving motion timing requires accurate knowledge of the object velocity. As will be appreciated, a velocity measurement is essential if the velocity is not constant and a nominal value cannot be employed.

Heretofore available non-contact gauging systems suitable for production line monitoring either employ a tachometer coupled to the conveyor or provide for timing of the passage of the object under inspection between a pair of measuring stations having known spacing. The former approach has various disadvantages, and the latter, though adequate in many cases has proved unsatisfactory for optical measurement of transparent objects. Under such circumstances the reflective and refractive properties of the objects under inspection make it desirable to obtain as few measurements on the object itself as possible. Accordingly, a different approach to velocity measurement has proved to be desirable.

The present invention seeks to overcome the above-noted limitations of heretofore available techniques in an optical system for measuring even optically transparent objects. According to this invention, article velocity is measured by timing the passage of a predetermined portion of the conveyor over a known distance defined by a series of equally spaced markers mounted on the conveyor. A transducer adapted to respond to passage of the markers provides the timing signals, and also provides a control signal to define a gauging interval during which the measurement circuits are activated. By choosing the gauging interval to embrace only the time that an object is expected to be in measuring position, it has been found possible to reduce greatly inaccuracies resulting from the high speed and close spacing of the objects and from transparency of the objects to the energy being employed in the inspection process.

In accordance with one embodiment of the invention, a measuring zone is defined along the path of a moving conveyor by a pair of light beams directed transversely to the direction of motion of the conveyor. Associated with each light beam is a photo-sensor so positioned that an object on the conveyor will pass through the light beam and occult the associated sensor as it passes.

The conveyor is equipped with a series of zone markers equally spaced along the conveyor, preferably at the same spacing as the objects themselves. A non-contact proximity sensor is disposed adjacent the path of the zone markers, and provides an output which is employed both to measure the conveyor velocity and also to initiate the gauging interval.

Accordingly, it is the general object of this invention to provide improved method and apparatus for non-contact measurement of linear dimensions of a sequence of relatively small, rapidly moving articles.

It is another object of this invention to provide such improved gauging method and apparatus in which there is established a measuring zone defined by a known spatial energy pattern in a region of space through which the article is to pass, and in which measurement is obtained by analysis of the effect on the spatial energy pattern resulting from traversal of the measuring zone by the article under inspection.

A related object of this invention is to provide such improved method and apparatus in which the velocity of the article under inspection is determined by measuring the time interval required for an object carrier to traverse a predetermined distance.

A further object of this invention is to provide such improved method and apparatus in which dimensional measurements are obtained by generating a first signal representing the time interval required for passage of different portions of the article under inspection into and out of the measuring zone, by generating a second signal representing the velocity of the object under inspection as it passes through the measuring zone and by deriving a measurement signal proportional to the ratio of the first and second signals.

Another object of the invention is to provide method and apparatus for non-contact dimension measurement of a sequence of moving objects in which a measuring zone of predetermined extent is established along the path of motion of the objects and in which a measurement is made of the time difference between arrival of the leading edge of an object at the downstream end of the measurement zone and the arrival of the trailing edge of the object at the upstream end of the measuring zone.

A related object of this invention is to provide such improved method and apparatus in which the objects are on a moving carrier, in which the carrier is provided with a series of spaced zone markers and in which the velocity of the object is determined by measuring the time required for the carrier to move a predetermined distance defined by the spacing between successive zone markers.

It is a further related object of this invention to provide such method and apparatus in which each object is associated with one of the sequence of zone markers, and in which a gauging interval for a particular object is established at a predetermined relation to the arrival time of the zone marker for that object at a reference location.

The exact nature of this invention, together with other objects and advantages thereof will be apparent in consideration of the following detailed description and accompanying drawing in which:

FIGS. 3a – 3f show the definition of the various time references pertinent to measurement according to this invention, and also various waveforms explanatory of the method of this invention;

Figure 1:
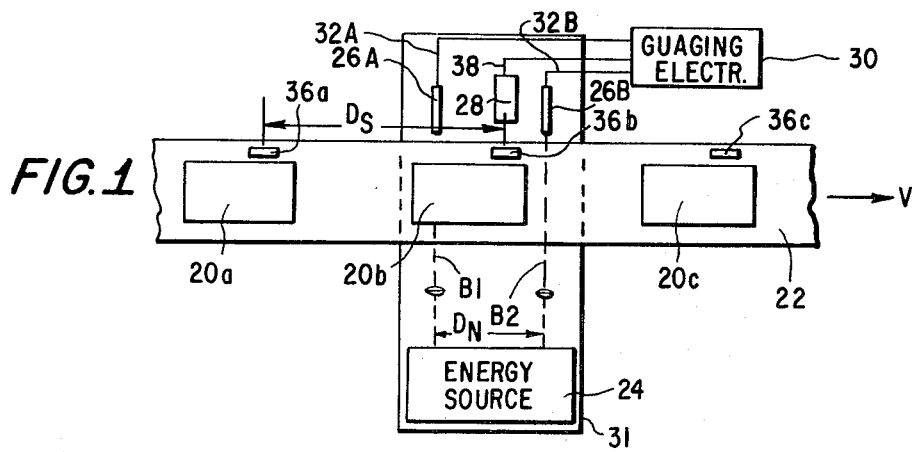
FIG. 1 and 2 are generalized representations of one application of the invention.
Figure 2:
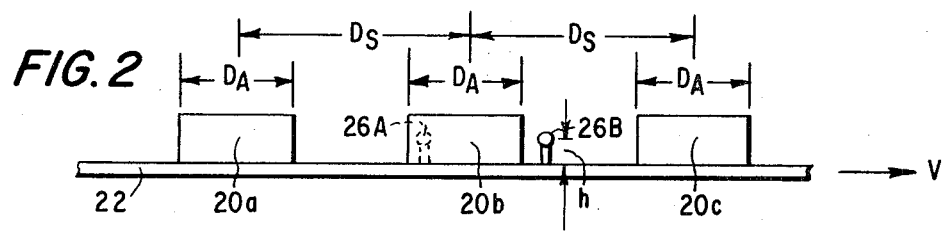
Figure 5:
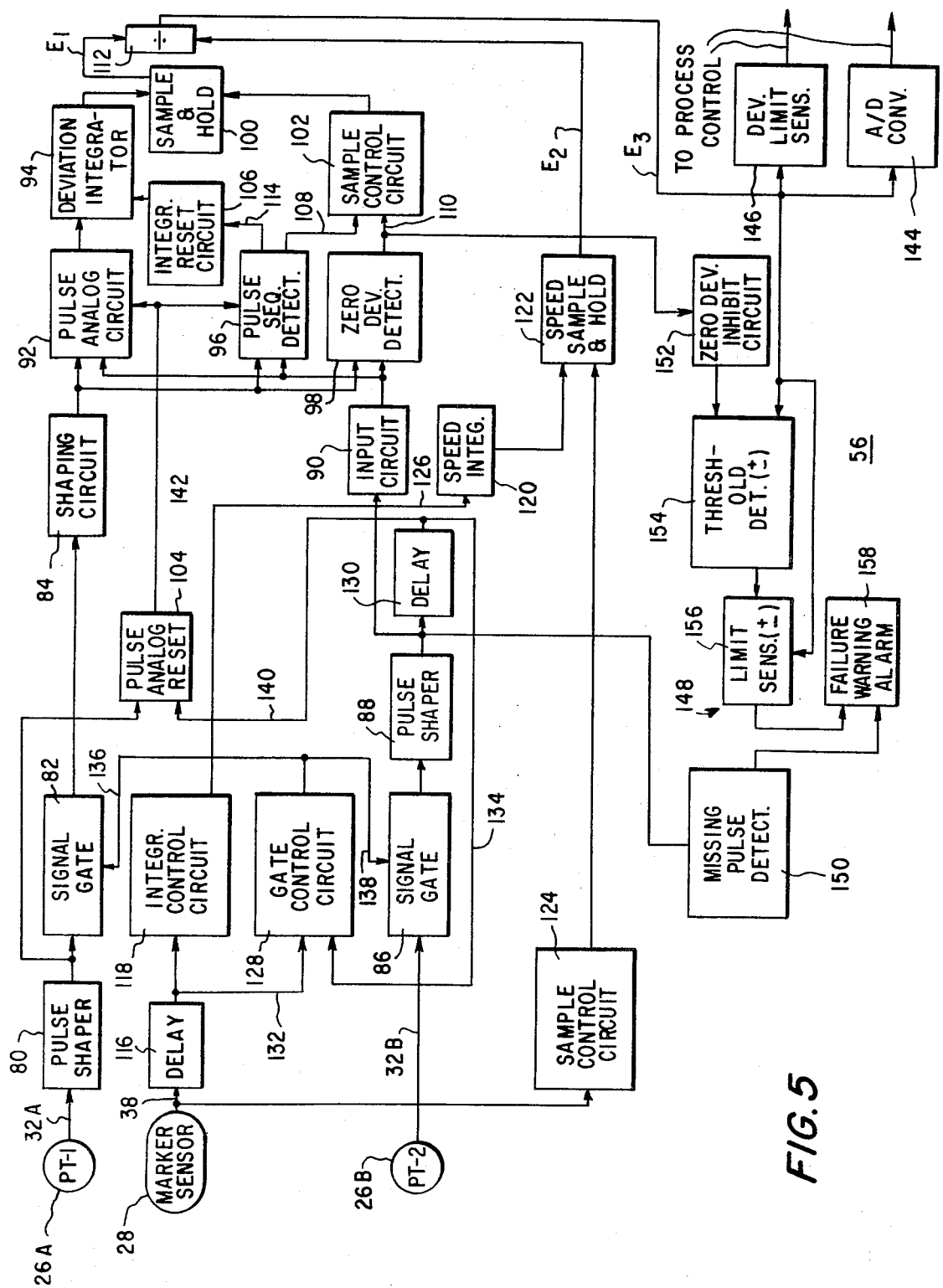
FIG. 5 is a detailed block diagram of the system shown in FIG. 4.
Figure 6A:
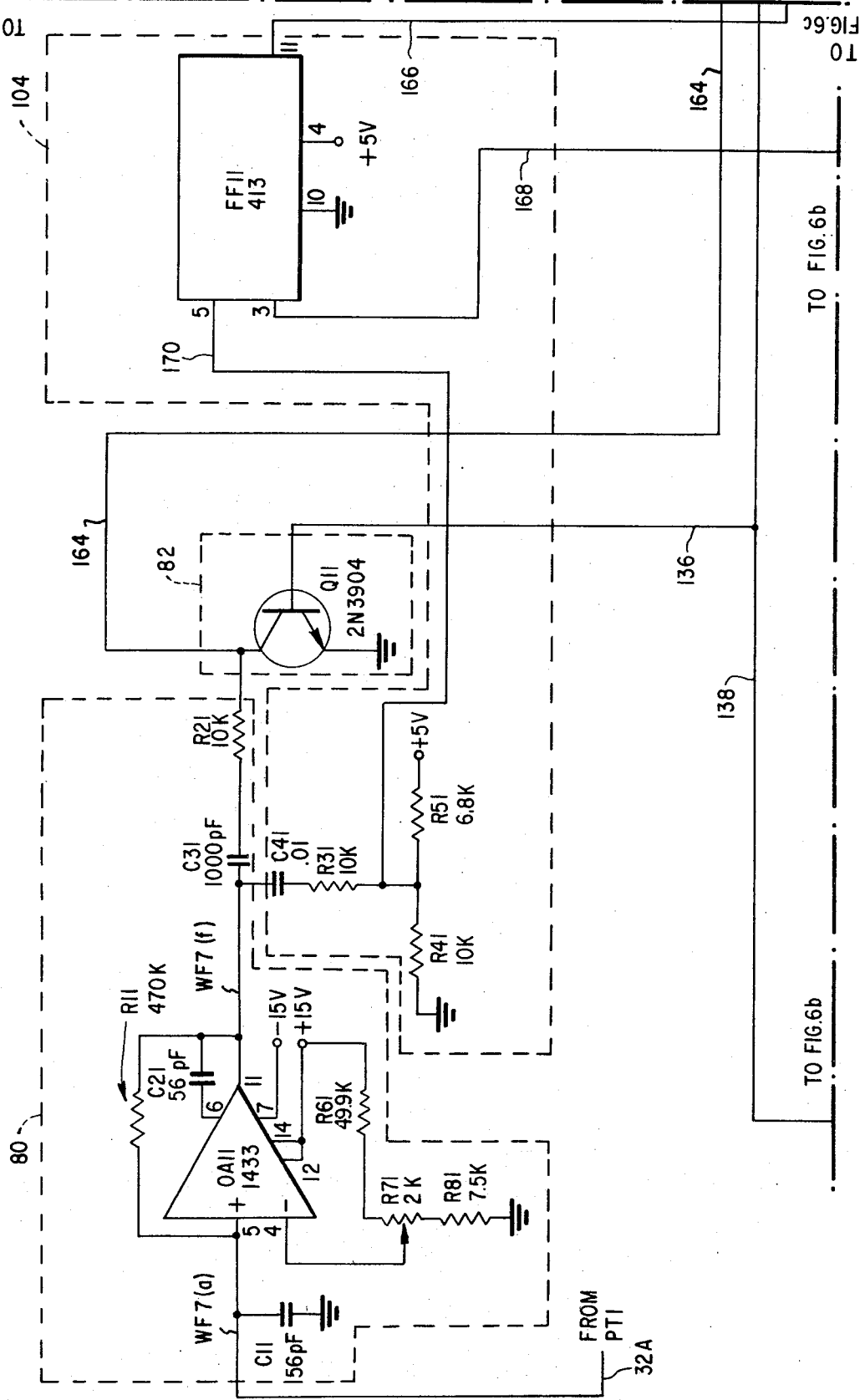
Figure 6B:
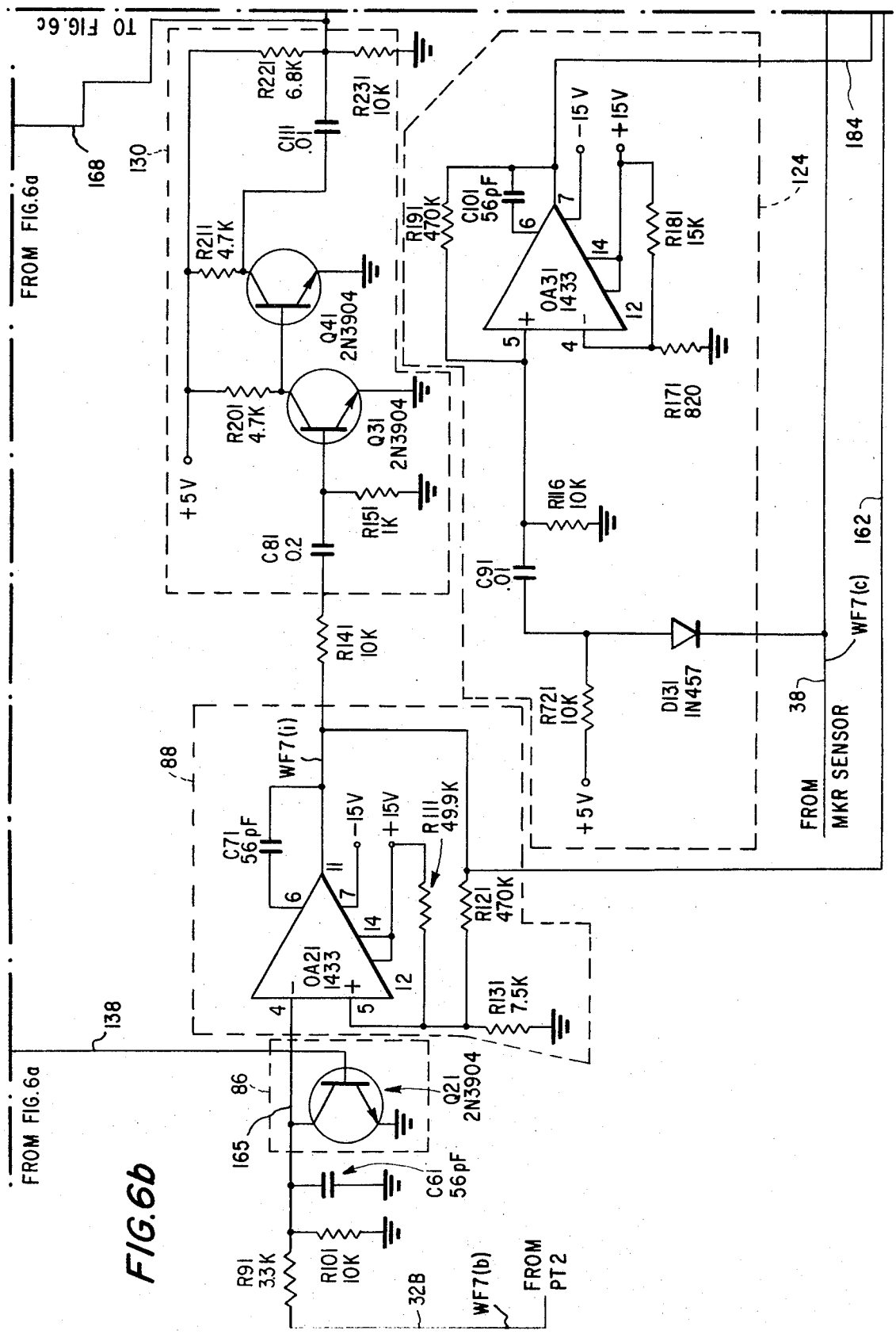
Figure 6C:
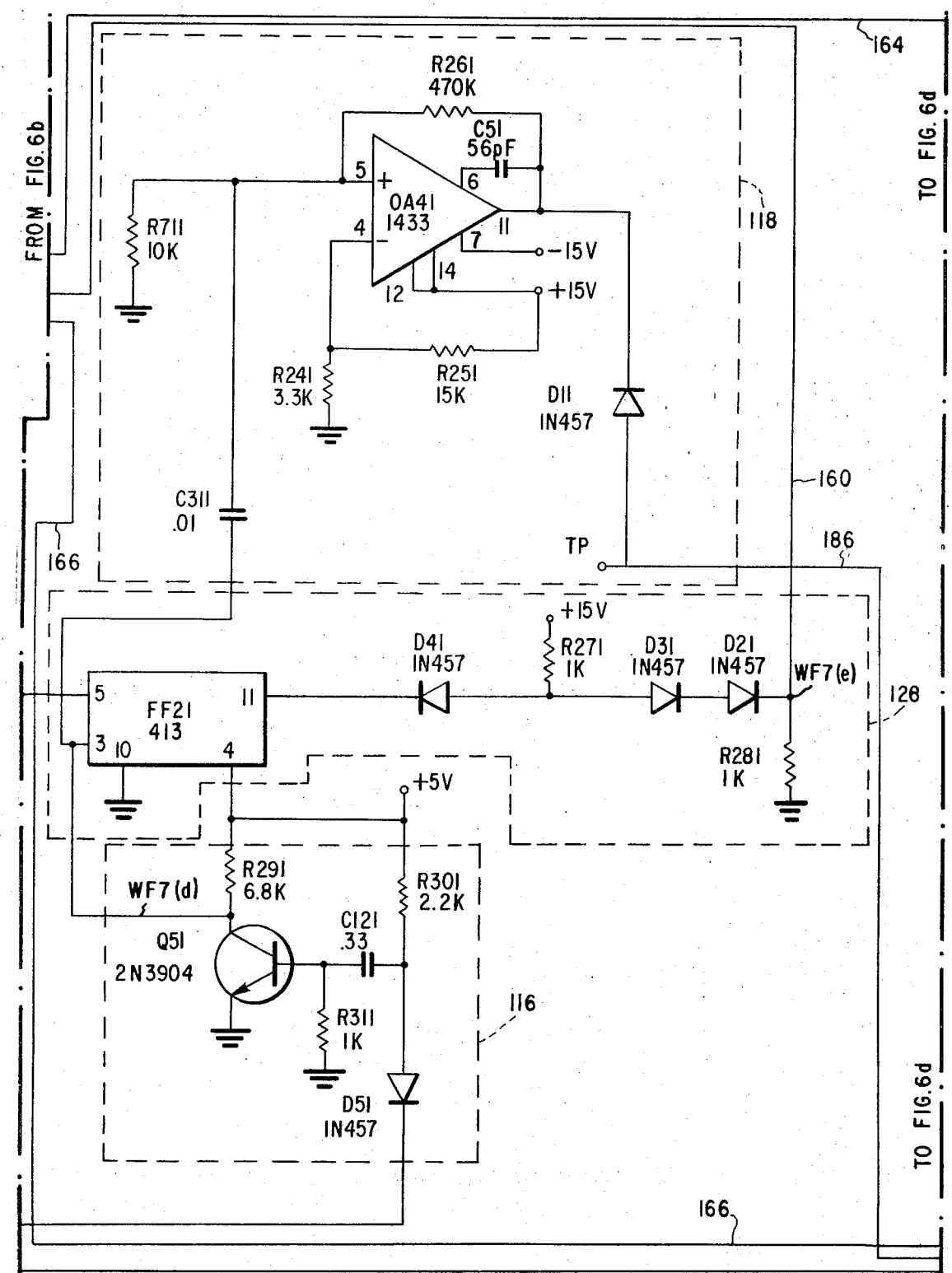
Figure 6D:
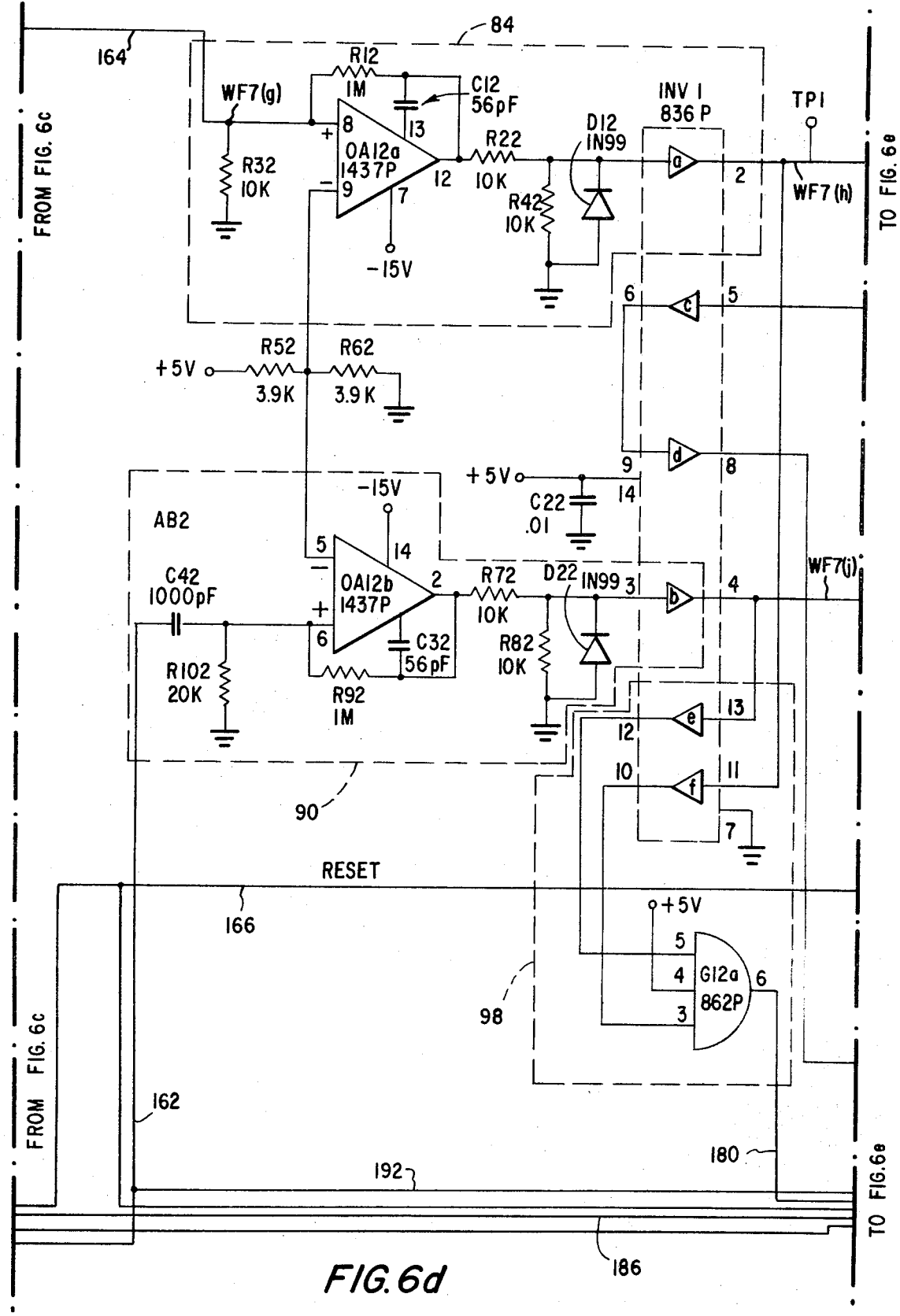
Figure 6E:
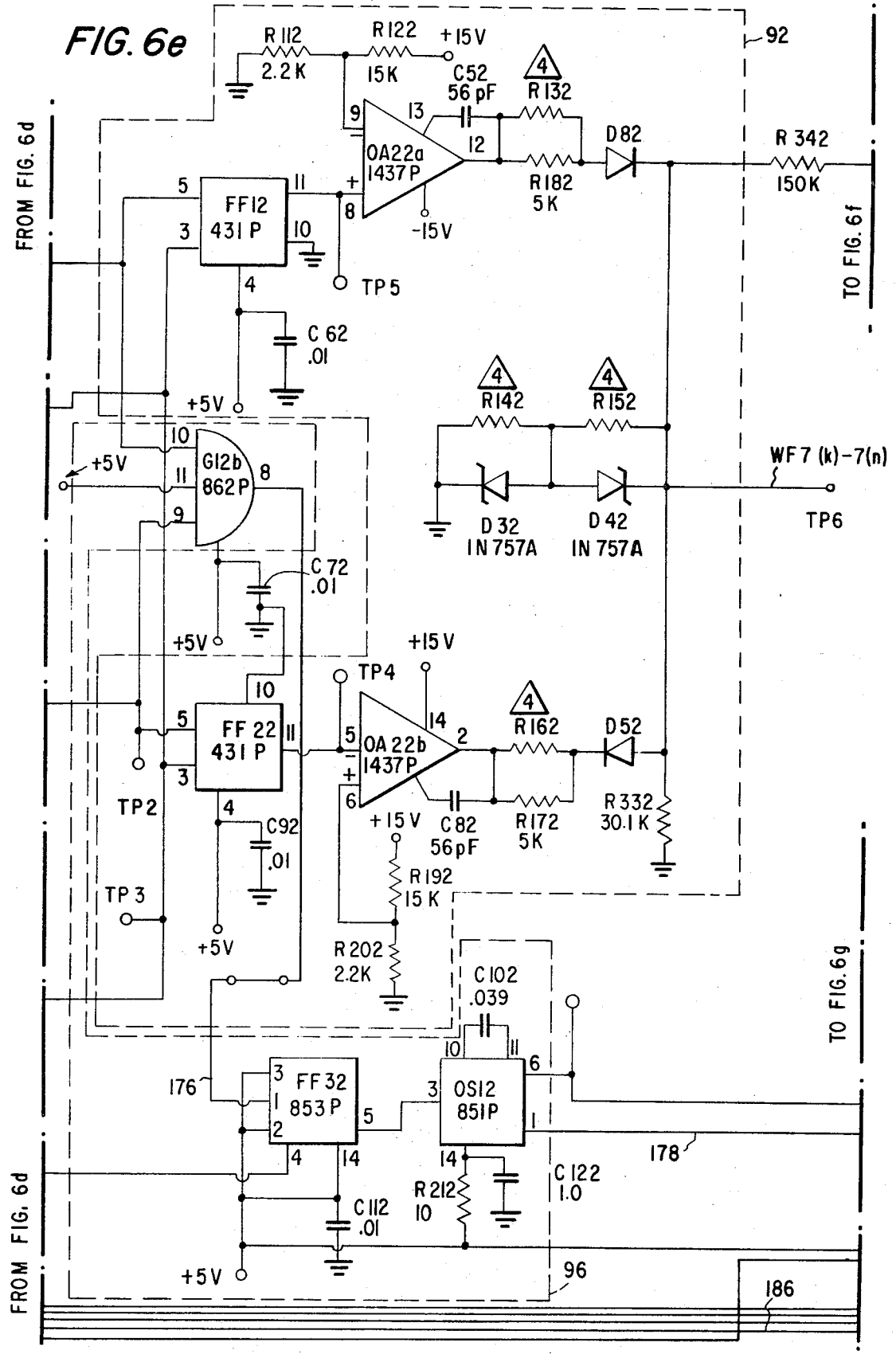
Figure 6G:
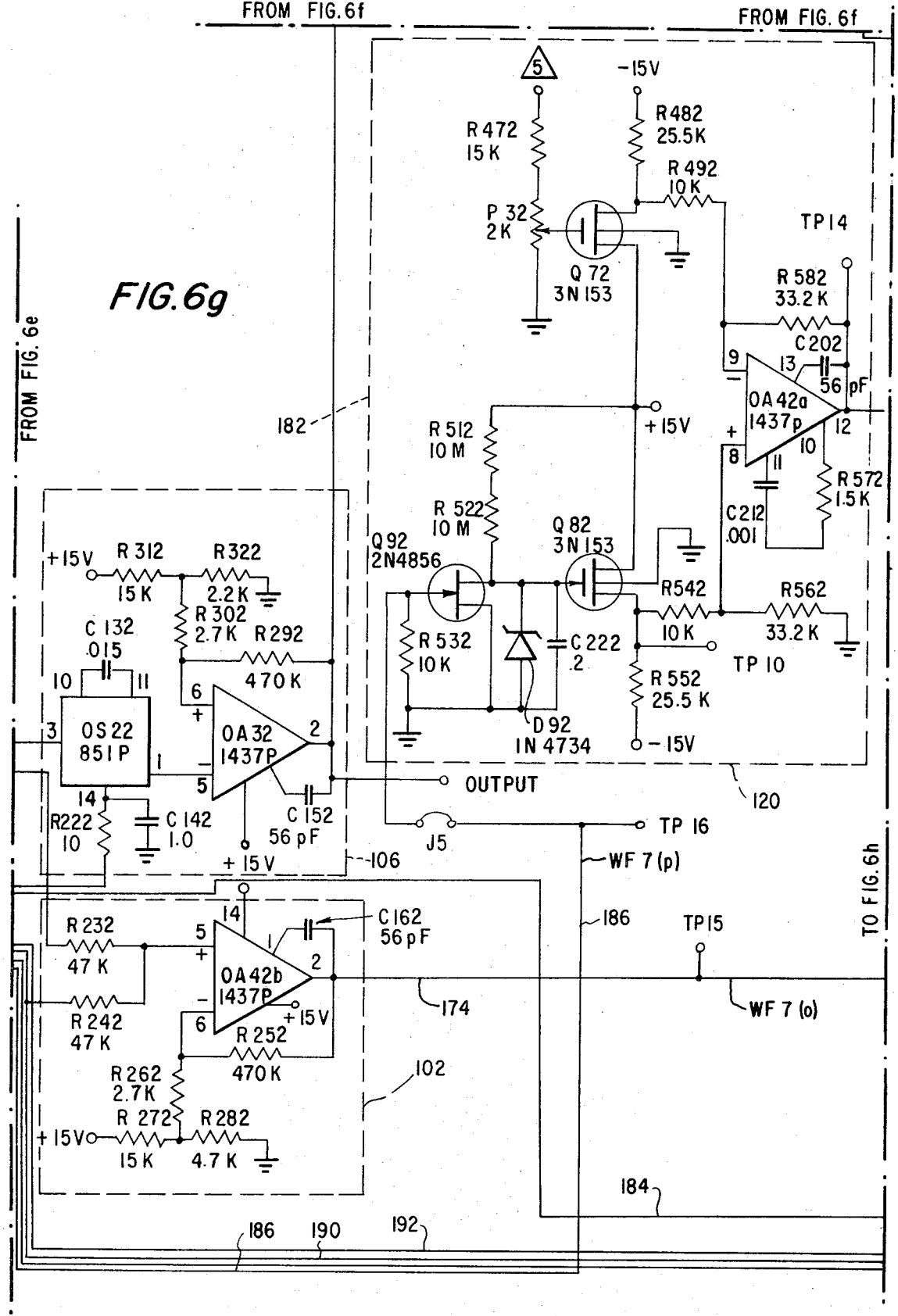
Figure 6H:
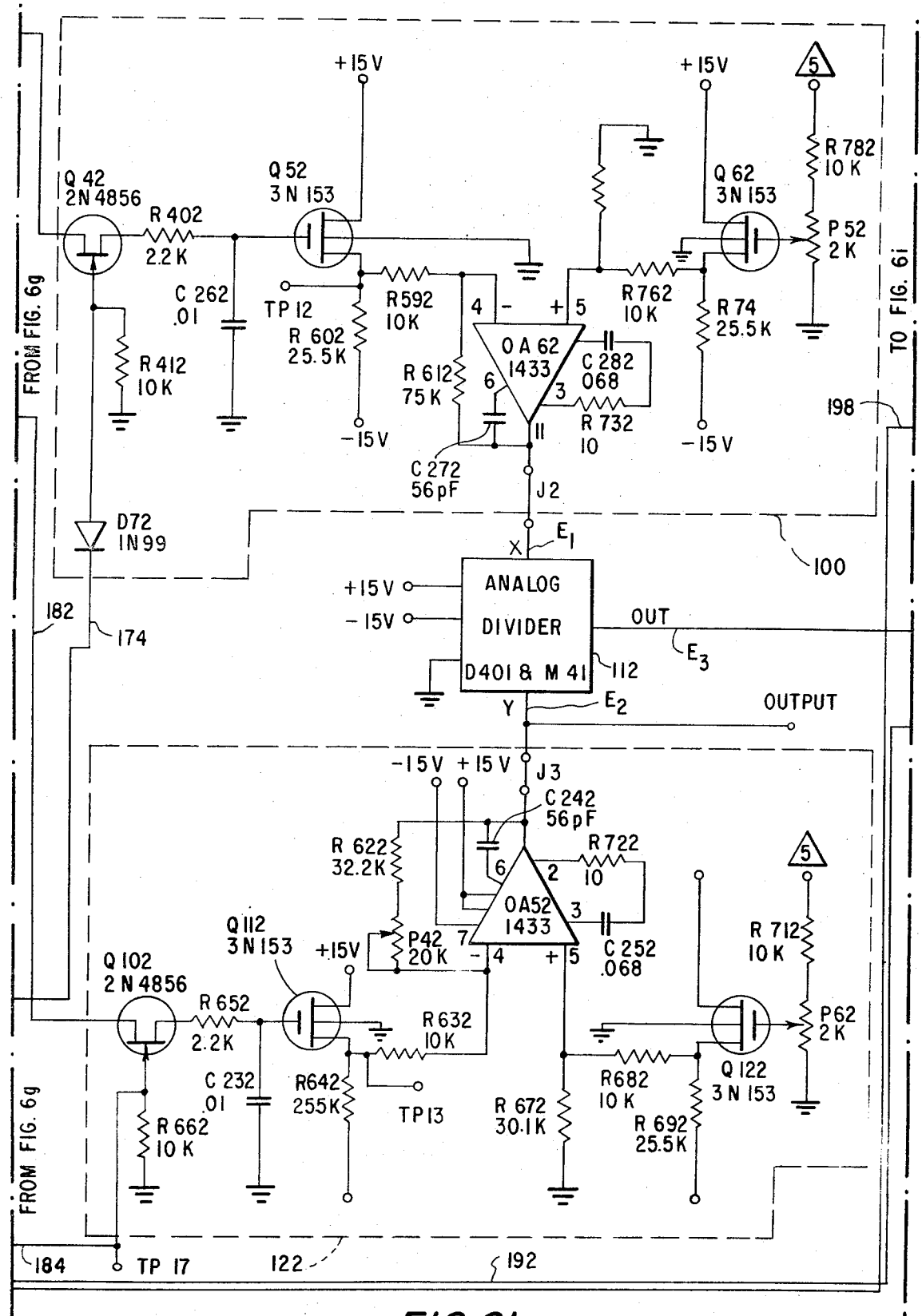
Figure 6I:
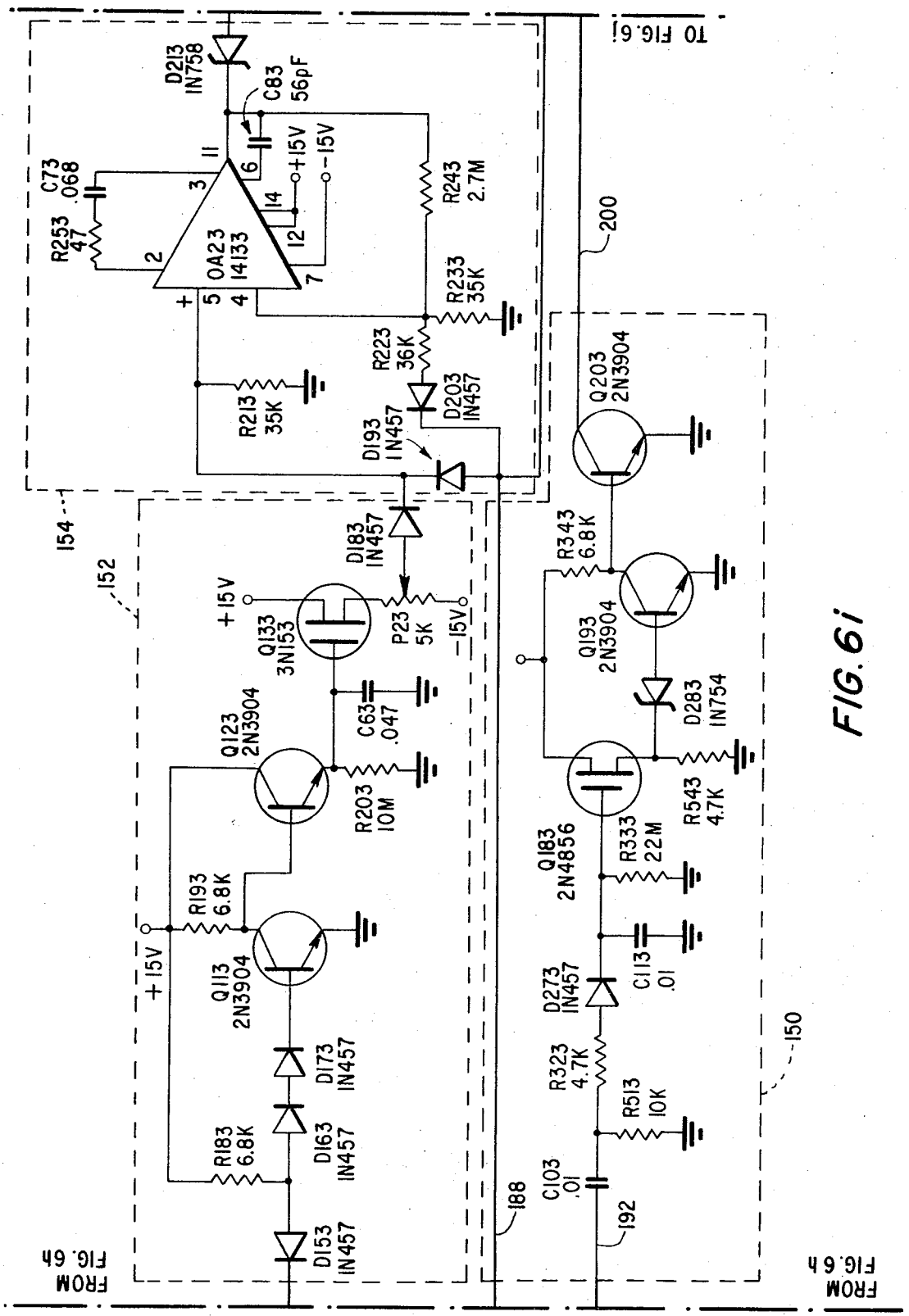
Figure 7:
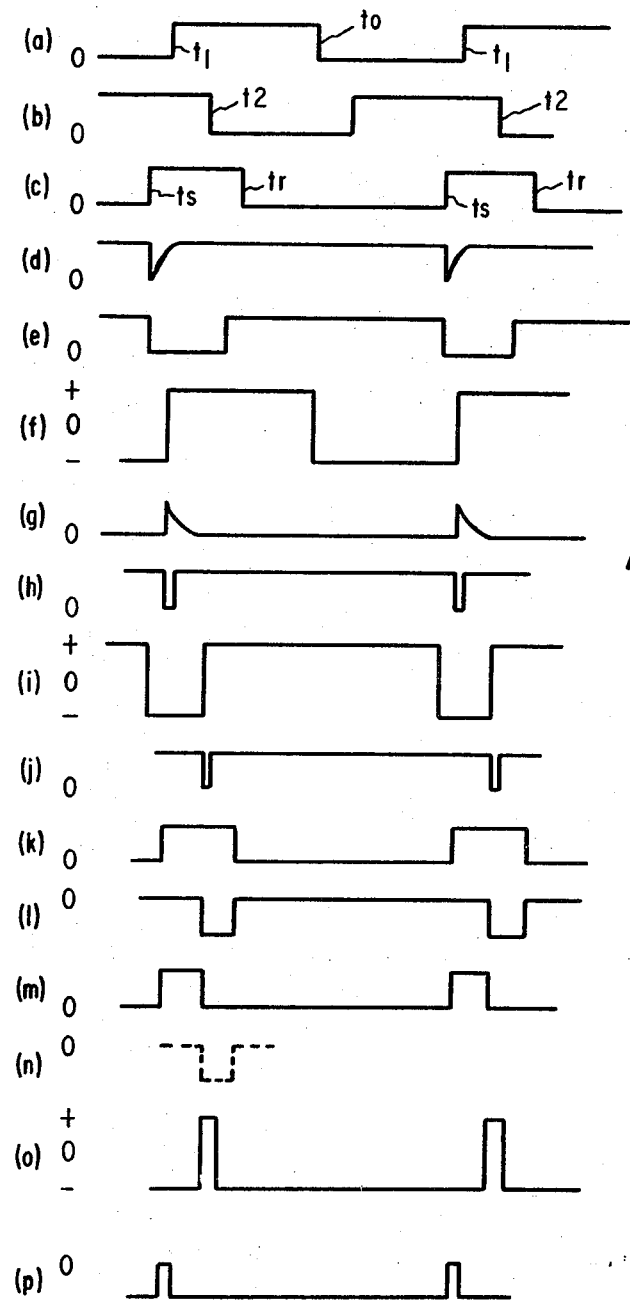

FIGS. 6a – 6j, assembled in the manner shown in FIG. 6k is a detailed circuit diagram of an embodiment of the system of FIG. 5; and FIG. 7 is a waveform diagram illustrative of the operation of the embodiment of FIGS. 6a through 6j;

FIGS. 1 – 3 illustrate the manner in which disturbance of the measuring zone energy pattern is employed for dimensional measurement in accordance with this invention.

Referring to FIGS. 1 and 2, a series of spaced objects, three of which are shown at 20a, 20b, and 20c, are supported on a conveyor 22, moving in the direction indicated, at a velocity V. For convenience of explanation, objects 20 are shown in the form of blocks having unknown dimensions $D_A$ between a leading edge A and a trailing edge B, but it will be appreciated that objects of any configuration, and particularly, the bottles mentioned above may be measured by the techniques described.

The measuring system comprises an energy source 24 which produces the spatial energy pattern defining the measuring zone, a pair of measuring sensors 26A and 26B, a reference sensor 28, and gauging electronics 30, all mounted on a supporting structure 31 of any suitable nature.

The measuring zone is defined by an "upstream" energy beam B1 and a "downstream" energy beam B2 spaced by a distance $D_N$ in the direction of conveyor motion, preferably equal to the anticipated nominal dimension of objects 20. In the illustrated embodiment, beams B1 and B2 are lightbeams, and sensors 26A and 26B are suitable photo-detectors, but it should be understood that other forms of electromagnetic energy or mechanical energy such as acoustic energy may be employed where feasible.

A recognizable disturbance of the energy pattern in the measuring zone can be produced by interception of light beams B1 and B2 by objects 20 as conveyor 22 moves along. Thus, energy source 24 is positioned to direct beams B1 and B2 across the path of objects 20 at a height h at which the dimensional measurement is to be made, with photosensors 26A and 26B positioned at the same height. Interception of beams B1 and B2 by the objects to be measured causes changes in the electrical outputs of sensors 26A and 26B which are coupled over leads 32A and 32B to gauging electronics 30 for utilization in the measurement as hereinafter explained.

For the bottle diameter gauging application being described, objects having a nominal diameter of 2.500 inches are to be measured with an accuracy of ±0.002 inch. To achieve such accuracy, beams B1 and B2 should have as small a cross section as possible. This is best achieved by employment of a laser as energy source 24, but an incandescent source and suitable collimating optics will also produce satisfactory results. Separate lasers may be employed, but a single laser and suitable beam splitting apparatus yields equally good results and is simpler and less costly.

Use of a laser light source (as against an incandescent source) has the additional advantage that the resulting light is monochromatic whereby narrow band optical sensors or filters may be conveniently employed to minimize the effect of background light at wavelengths other than that of the measuring beams.

In the illustrated embodiment, measurement is based on the time interval between arrival of the leading edge of a bottle at the downstream end of the measuring zone and the arrival of the trailing edge of the bottle at the upstream end of the measuring zone. Referring to FIGS. 3a – 3c, let a recurring time frame begin, with time $t=0$ when the leading edge A of bottle 20 reaches the upstream light ray B1. A time $t=t_1$ is defined as the time the trailing edge B of the bottle reaches upstream light ray B1. A time $t=t_2$ is defined as the time that leading edge A of the bottle reaches downstream light ray B2.

Assuming the bottle is travelling at a constant velocity V, then $$t_1 = (D_A)/(V) \quad (1)$$
$$t_2 = (D_N)/(V) \quad (2)$$

Therefore, a measurement representing deviation from the nominal dimension $D_N$ can be obtained by measuring the time interval $t_2 - t_1 = \Delta t = (D_N - D_A)/(V) \quad (3)$ As will be appreciated from FIGS. 3a – 3c, if $D_N = D_A$ then $\Delta t = 0$, i.e., $t_1 = t_2$.

On the other hand, if $D_A$ is less than $D_N$, then trailing edge B will reach beam B1 before leading edge A reaches beam B2 and time $t_1$, will occur before time $t_2$. If $D_A$ is greater than $D_N$, leading edge A will reach beam B2 before trailing edge B reaches beam B1, and time $t_2$ will occur before time $t_1$.

Now, assume that it is possible to generate a voltage pulse having a duration equal to $\Delta t$ with positive polarity if $t_1$ occurs before $t_2$ and negative polarity if $t_1$ occurs after $t_2$. These alternatives are shown in FIG. 3d, along with the case of a zero pulse width, corresponding to zero deviation or $\Delta t = 0$. All information needed to solve equation (3) above is contained in a pulse such as shown in FIG. 3d, assuming the velocity V is known, or can be determined as hereinafter explained.

For most convenient processing, deviation pulses such as illustrated in FIG. 3d are generated, and then converted into an amplitude analog signal by integration. The result, illustrated in FIG. 3e will be a ramp, with amplitude $E_1$ defined by the relationship $$E_1 = \pm K_1 \Delta t. \qquad (4)$$

The amplitude analog has a positive amplitude if $t_1$ occurs before $t_2$, a negative amplitude if $t_1$, occurs after $t_2$, and a zero amplitude if $t_1 = t_2$.

Upon occurrence of the second of the two times $t_1$ and $t_2$, the integrator output is sampled, and from equation (3), $$E_1 = \pm K_1 \Delta t = \pm K_1 (D_N - D_A)/V. \qquad (5)$$

As may be seen from equation (5), the accuracy of signal $E_1$ as a representation of deviation between the actual and nominal dimension depends upon the accuracy with which the velocity V is known, or may be determined at times $t_1$ and $t_2$.

If the velocity is constant, a simple scale factor may be employed to convert equation (5) to an actual dimension analog. However, where the velocity is subject to variation, an instantaneous value of velocity must be employed in solving equation (5).

A simple approach to velocity measurement would be to time the passage of leading edge A of the bottle between light beams $B_1$ and $B_2$. However, for gauging of transparent objects, refraction and/or other distorting effects make it preferable to avoid any unnecessary measurements on the bottle. For this reason, and also to facilitate timing of the measurement interval as hereinafter explained, velocity is determined by measuring the time required for conveyor 22 to travel a fixed distance.

Referring again to FIG. 1, conveyor 22 is provided with a series of zone markers, three of which are shown at 36a, 36b and 36c, spaced along the conveyor at a distance corresponding to the object separation distance $D_S$. The markers are constructed of a material lending itself to non-contact detection, and are secured to the conveyor in any suitable fashion. For example, the markers may be a series of metal flags positioned to pass in close proximity to reference sensor 28. The latter may be an eddy current pickup or other suitable device capable of providing an output in response to close passage of zone markers 36.

Since the markers are equally spaced along the conveyor by a distance $D_S$, the time interval $t_S$ between successive output signals from reference sensor 28 can be employed as a measure of the conveyor velocity in accordance with the relationship:

$$t_S = (D_S)/(V) \qquad (6)$$

Assuming that the output of sensor 28 on lead 38 is in the form of a train of marker pulses having a repetition period $t_S$, the required measurement may be most conveniently be made by integrating a fixed DC level and sampling and resetting the integrator with each marker pulse. The result will be a saw tooth waveform as shown in FIG. 3f, having an amplitude $E_2$ determined by the relationship:

$$E_2 = K_2 t_S = (K_2 D_S)/(V) = K_3/(V) \qquad (7)$$

since $D_S$ is constant.

Combining equations (5) and (7)

$$E_3 = (E_1)/(E_2) = (K_1/(K_3)) (D_N - D_A) \qquad (8)$$

or $$E_3 = K_4 (D_N - D_A). \qquad (9)$$

Thus, by dividing a deviation analog signal which is a function of velocity by a velocity analog signal, the velocity dependence is eliminated.

For bottle diameter gauging, or for other applications where the object under inspection is transparent to the energy beams defining the measuring zone, accuracy of measurement is greatly enhanced by defining a short gauging interval of slightly greater duration than the anticipated time interval $\Delta t$. The gauging circuitry is activated only during the gauging interval. At all other times the measuring circuits are not responsive to variations of the sensor outputs. The measuring circuitry is preferably actuated just before the earliest possible occurrence of time $t_1$ and $t_2$ and is permitted to continue for a time slightly longer than the maximum possible interval $\Delta t$.

The foregoing is most conveniently accomplished by starting the gauging interval when the zone marker associated with a particular object being inspected reaches marker sensor 28. Referring to FIG. 1, this may easily be accomplished by locating the markers in a suitable position relative to the objects and by locating sensor 28 so that a marker reaches the sensor at the desired time.

Figure 4:
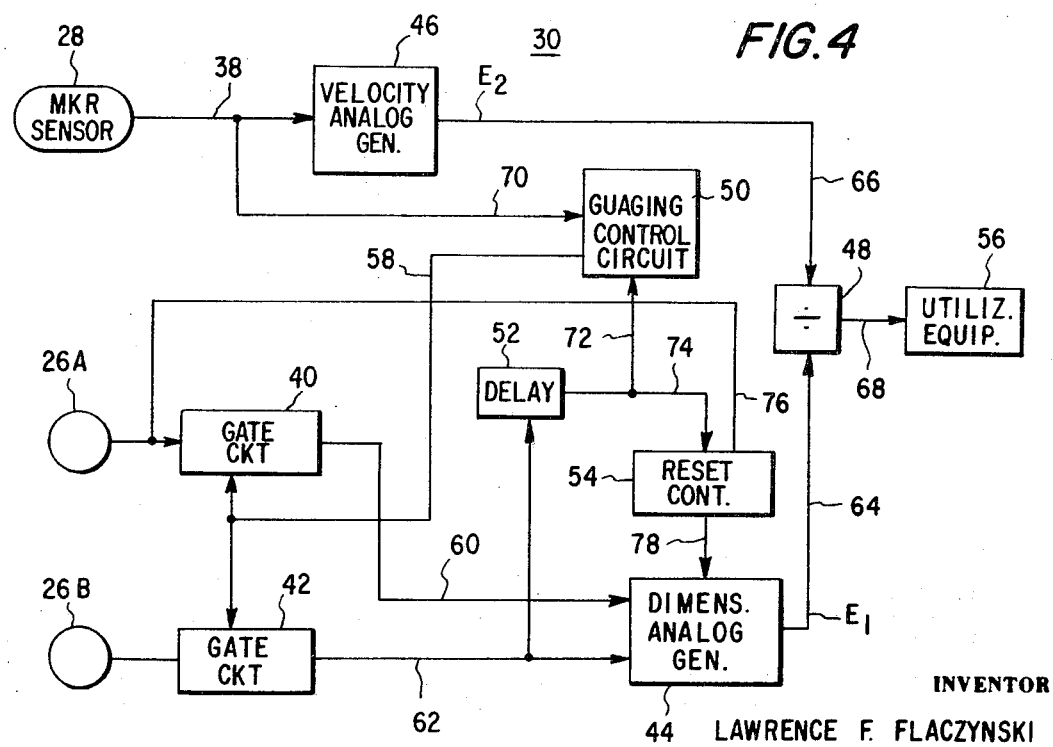
FIG. 4 is a simplified block diagram of a gauging system of this invention.

FIG. 4 is a block diagram of the essential features of a bottle gauging system capable of providing the above-described functions. Included are upstream and downstream gate circuits 40 and 42, dimension analog generator 44, velocity analog generator 46, analog divider 48, gauging control circuit 50, reset delay circuit 52, reset control circuit 54, and output utilization equipment 56.

The $t_1$ and $t_2$ signals are provided by sensors 26A and 26B respectively, as input signals to gates 40 and 42. Control inputs for the gates are provided over lead 58 from gauging control circuit 50. During the gauging interval as described below, gates 40 and 42 are actuated and provide the $t_1$ and $t_2$ signals over leads 60 and 62, respectively, to dimension analog generator 44. This produces the $E_1$ signal on lead 64 defined by equation (5), which is the amplitude analog of $D_N - D_A$.

The marker pulse signals are provided by sensor 28 as a control input for velocity analog generator 46. This circuit operates as an integrator having a fixed input, and thus generates a continuously growing ramp output. However, the circuit is adapted to be reset to zero by the marker pulse output of sensor 28 on lead 38. Since the maximum output level depends on the time between marker pulses, and this, in turn, depends on the time required for conveyor 22 to advance a predetermined distance, i.e., the velocity, the output signal on lead 66 is the velocity analog $E_2$ defined by equation (7).

The $E_1$ and $E_2$ signals on leads 64 and 66 are connected to analog divider 48 which operates to produce the $E_3$ signal defined by equation (9). This, in turn, is connected over lead 68 to any suitable utilization equipment needed in the process being controlled. This could include, for example, recording equipment, alarm circuitry, feedback control equipment to correct process malfunctions, etc.

Sensing gates 40 and 42 are actuated only during a gauging interval in which occurrence of times $t_1$ and $t_2$ signals is anticipated. This is controlled by gauging control circuit 50. The latter is a two-state circuit which receives a first input from marker sensor 28 on lead 70 and a second input on lead 72 from downstream sensor 26B through delay circuit 52 representing a delayed version of the $t_2$ signal. Gauging control circuit 50 responds to the marker pulse to turn on gates 40 and 42, an to the delayed $t_2$ signal to turn off gates 40 and 42, thereby establishing the duration of the gauging interval. The delay produced by circuit 52 is slightly longer than the maximum anticipated time $\Delta t$. Thus, the gauging interval is of sufficient duration to complete a measurement whether the $t_1$ or the $t_2$ signal arrives first.

The output of delay circuit 52 is also connected over lead 74 as one input to reset control circuit 54, a second input to which is provided over lead 76 from upstream sensor 26A. Reset control circuit 54 provides a control signal on lead 78 for dimension analog generator 44. The delayed $t_2$ signal causes dimension analog generator 44 to be reset, returning the output signal $E_1$ to a zero value in preparation for measurement of the next object, while the signal from upstream sensor 26A causes dimension analog generator 44 to be reactivated when the next object actually enters the measuring zone.

FIG. 5 shows a detailed block diagram of gauging system 30. Again, dimension measuring information is provided by energy sensors 26A and 26B, which may be photo-transistors, and the velocity and measuring interval control information is provided by marker sensor 28 which may be an eddy current pickup for purposes of illustration. As previously explained, upstream sensor 26A provides the $t_1$ signal while downstream sensor 26B provides the $t_2$ signal. Sensor 26A also provides a $t$ = signal for reset purposes as explained below.

The $t_1$ signal generating circuit includes an input pulse shaper 80, a signal gate 82 and a second shaping circuit 84, connected in series to the output of sensor 26A. The $t_2$ signal is generated by a circuit including a signal gate 86, and first and second pulse shapers 88 and 90 connected in series to the output of sensor 26B. The outputs of $t_1$ shaping circuit 84 and $t_2$ shaping circuit 90 are connected as inputs to a pulse analog circuit 92 which operates to generate the positive or negative pulse width analog signal illustrated in FIG. 3d.

The pulse width analog signal is converted into the amplitude analog signal $E_1$ defined by equation (5) by circuitry including a deviation integrator 94, a pulse sequence detector 96, zero deviation detector 98, sample and hold circuit 100, sample control circuit 102, pulse analog reset circuit 104, and integrator reset circuit 106.

Integrator 94 operates to convert the pulse analog by generating a ramp signal of increasing or decreasing amplitude, depending on the polarity of the pulse signal. The integrator output is provided as the signal input for sample and hold circuit 100.

Control of integrator 94 and sample and hold 100 is provided by pulse sequence detector 96, and zero deviation detector 98. These circuits are connected in parallel with the inputs of pulse analog circuit 92 and operate in response to occurrence of the $t_1$ and $t_2$ signals. Sequence detector 96 produces an output on lead 108 when $t_1$ and $t_2$ appear in sequence (irrespective of the order of occurence) to actuate sample control circuit 102, while zero deviation detector 98 actuates the sample control circuit over lead 110 when $t = 0$, i.e., when $t_1 = t_2$. When actuated, sample control circuit 102 operates sample and hold circuit 100 to connect the output of integrator 94, i.e., the $E_1$ signal, to an analog divider 112 which also receives the $E_2$ signal as hereinafter described to produce the deviation analog signal $E_3$.

A second output of pulse sequence detector 96 is coupled over lead 114 to integrator reset circuit 106. This operates to return the output of deviation integrator 94 to a zero value in readiness for the next pulse width analog signal. The reset occurs just after sampling of the $E_1$ signal by circuit 100 has been completed.

The output of marker sensor 28 is used to generate the speed analog signal $E_2$, and also to establish the measuring interval, as previously noted. The speed analog generating circuitry includes a selective delay circuit 116, an integrator control circuit 118, a speed integrator 120, a speed sample and hold circuit 122, and a sample control circuit 124.

Integrator 120 includes an internal DC voltage source and operates to generate a continuously increasing ramp. The integrator is so constructed that an input signal on lead 126 from control circuit 118 resets integrator output to zero. Control circuit 118, in turn, operates in response to successive outputs of marker sensor 28. Control The output of marker sensor 28 is also connected to the input of speed sample control circuit 124, which operates speed sample and hold circuit 122 in response to each marker pulse. Note, however, that control circuit 124 operates directly responsive to the marker pulse, while integration control circuit 118 is operated through delay circuit 116. As explained below, delay circuit 116 provides both a direct (undelayed) and a delayed version of the marker pulse, the former being employed for establishing the gauging interval, and the latter to reset integrator 120.

As a result, the velocity integration period is slightly less than the time $t_S$ as defined in equation (6). However, the delay is quite small, e.g., less than 0.001 sec., and for the bottle measuring embodiment being described, typical values of $t_S$ would be 0.25 − 0.05 sec., so the error introduced is negligible.

The gauging interval control circuitry includes a gate control circuit 128, and a reset delay circuit 130. Gate control circuit 128 is a two-state device constructed to be set in one state by the marker pulse over lead 132 from delay circuit 116, and in a second state by the output of delay circuit 130 over lead 134. When in its first state, gate control circuit 128 provides a signal on leads 136 and 138 to activate gates 82 and 86 respectively in anticipation of the $t_1$ and $t_2$ signal outputs of sensors 26A and 26B.

The duration of the sensing interval is set by delay circuit 130 which responds to the $t_2$ signal at the output of pulse shaper circuit 88 to switch gate control circuit 128 to its second state a predetermined time after the $t_2$ signal. To provide for an adequate gauging interval when the $t_2$ signal occurs prior to the $t_1$ signal, the delay introduced by circuit 130 is chosen to be slightly greater than the maximum anticipated (or acceptable) deviation interval $\Delta t$.

Delay circuit 130 also provides an input over lead 140 to pulse analog reset circuit 104, the latter being a two-state circuit like gate control circuit 128. Reset circuit 104 is adapted to be set to a first state by the output of delay circuit 130 and to its second state by the $t_0$ signal from upstream sensor 26A provided through pulse shaper 80. In its first state, i.e., at the end of the gauging interval, reset circuit 104 provides a signal over lead 142 to turn off pulse analog circuit 92 and pulse sequence detector 96. The $t = 0$ signal causes reset circuit 104 to reactivate pulse analog circuit 92 and pulse sequence detector 96 in preparation for the next measurement.

The system illustrated in FIG. 5 also includes utilization equipment generally denoted at 56. Such equipment is connected to the $E_3$ signal output of analog divider 112 circuits 144 and 146 may include an analog to digital converter 144, and a deviation limit sensor 146 as system outputs. These may be used for process control or other required functions.

The analog to digital converter is of any conventional or desired construction and operates to provide a digital format for the deviation information developed by the gauging system. Deviation limit sensor 146 is a threshold circuit of suitable construction and provides an output when the measured deviation exceeds a predetermined limit. This output may be employed to actuate a rejection mechanism or for any other desired purpose.

Utilization equipment 56 may also include a failure warning monitor 148 comprised of a missing pulse detector 150, a zero deviation inhibit circuit 152, a deviation threshold detector 154, a failure warning limit sensor 156, and a failure warning alarm 158. Monitor 148 serves as an indication of proper gauging system operation, and provides an alarm indication in the case of malfunction.

Missing pulse detector 150 is connected to the output of the $t_2$ pulse shaper 88 and provides an output to the failure warning alarm 158 if a $t_2$ pulse does not appear within the expected time period. A failure alarm is also provided if the level of $E_3$ signal exceeds a predetermined magnitude (indicating an impossibly oversized or undersized product), or is zero for some reason other than a zero deviation measurement.

FIGS. 6a – 6j, assembled in the manner indicated in FIG. 6k show a circuit diagram of a preferred embodiment of a bottle diameter gauging system as shown in FIG. 5. Conventional circuit notation is employed with block diagrams in the circuit representing commercially available integrated circuits manufactured by Motorola Semi-conductor Products, Inc. of Phoenix, Arizona. For example, the device labeled OA11 in FIG. 6a is a two input operational amplifier, series MC1433; device FF11 in FIG. 6a is a "set-reset" flip flop series MC413, etc. (The prefix "MC" has been omitted throughout.)

In addition, FIGS. 6a – 6j include dashed lines segregating groups of circuit elements to show the correspondence between the circuit diagram and the block diagram of FIG. 5. Thus, in FIG. 6a, dashed block 80 represents pulse shaper 80 in FIG. 5, dashed block 82 represents signal gate 82 in FIG. 5, etc. Circuit operation is described in conjunction with the waveform diagrams of FIG. 7.

GAUGING SIGNAL GENERATION

Referring to FIGS. 6a and 6b, measuring inputs are provided on leads 32A and 32B from upstream sensor 26A and downstream sensor 28B, respectively, while the marker input is provided over lead 38 from sensor 28. Waveforms (a) through (c) in FIG. 7 represent the sensor outputs for two successive articles passing through the measuring zone. Waveforms (a) and (b) illustrate the case of $D_A$ being less than $D_N$, i.e., a situation in which times $t_1$ occur prior to times $t_2$ for both objects in the sequence.

As will be recalled, time $t_1$ represents the moment that the trailing edge of the object reaches the upstream end of the measuring zone, and time $t_2$ represents the moment that the leading edge of an object reaches the downstream end of the measuring zone. Thus, at time $t_1$, upstream sensor 26A will be illuminated, and at time $t_2$ downstream sensor B will be occulted. This is indicated in waveform 7(a) by an increase in the signal level at time $t_1$ and in waveform 7(b) by a drop in the signal level at time $t_2$.

Similarly, it will be recalled that time $t_0$ represents the moment the leading edge of an object reaches the upstream end of the measuring zone, causing sensor 26a to be occulted. This is indicated in waveform 7(a) by a drop in the signal level at time $t_0$.

As previously mentioned, the marker associated with a particular object is positioned to actuate marker sensor 28 at a time $t_S$ just prior to the earliest possible occurrence of either time $t_1$ or $t_2$. This is indicated in waveform 7(c) by an increase in signal level at the times $t_S$ just prior to times $t_1$ for the objects associated with the waveforms 7(a) and 7(b). At predetermined times $t_R$ later, the measuring interval is terminated by passage of the marker out of the sensitive range for pickup 28 as indicated by the decreased signal level in waveform 7(c) at these times. However, the time interval $t_R - t_S$ is selected to be slightly greater than the expected maximum value for $\Delta t$. Thus the measurement will be completed before time $t_R$ as hereinafter explained, and termination of the gauging interval ordinarily does not affect system operation.

COMMENCEMENT OF THE GAUGING INTERVAL

Circuit actuation in response to the $t_S$ signal is controlled by transistor gates 82 and 86 (FIGS. 6a and 6b) selective delay circuit 116 and gate control circuit 128 (FIG. 6c).

Delay circuit 116 includes an input diode D51, and a transistor Q51 having an RC base bias circuit comprised of resistors R301 and R311 and capacitor C121. Gate control circuit 128 comprises a SET-RESET flip flop FF21 and a resistance-diode switching circuit comprised of diodes D21, D31 and D41, and resistors R271 and R281. The latter provides common base bias for transistors Q11 and Q21 in signal gate 82 and 86 (FIGS. 6a and 6b) over leads 160, 136 and 138.

Flip flop FF21 is set by a negative going signal at terminal 5 and is reset by a negative going signal at terminal 3. In the SET state, the output at terminal 11 is high and in the RESET state, the output is low.

As indicated by waveform 7(c), the signal level on lead 38 is low except during the gauging interval. Diode D51 is normally forward biased and provides a current path through resistor R301 and the sensor circuit from the positive power supply. Capacitor C121 is charged so the voltage at the base of transistor Q51 is zero and the transistor is cut off. With transistor Q51 cut off, the voltage at terminal 3 of flip flop FF21 is high. This is shown by waveform 7(d).

As explained hereinafter, flip flop FF21 is set by a signal from delay circuit 130 in response to the $t_2$ signal. The high output signal back biases diode D41, providing a current path from the positive supply voltage through diodes D31 and D21 and resistor R281. The positive voltage across resistor R281 turns on signal gate transistors Q11 and Q21 (see FIGS. 6a and 6b). The voltage across resistor R281 is shown by waveform 7(e).

With transistors Q11 and Q21 turned on, substantially zero voltage is maintained on leads 164 and 165, respectively. This prevents passage of signal outputs of sensors 26A and 26B to the gauging circuits as hereinafter explained.

At time $t_S$ the voltage on lead 38 resets (see waveform 7(c)), back biasing diode D51 (FIG. 6c). Capacitor C121 charges, providing a current path from the positive supply through resistor R301, capacitor C121, and resistor R311. This provides base bias for transistor Q51 which begins to conduct. The collector voltage drops, and a negative going pulse is provided at RESET terminal 3 of flip flop FF21, as shown by waveform 7(d). FF21 is reset, and the output voltage at terminal 11 drops to zero. Diode D41 is forward biased, and the current flow through resistor R281 ceases, causing the voltage on lead 160 to drop to zero. [See waveform 7(e).] With zero base bias, transistors Q11 and Q21 are turned off which removes the shunt from leads 164 and 165. This permits gauging signals from sensors 26A and 26B to reach the remainder of the gauging circuitry INPUT CIRCUITRY FOR SENSORS 26A and 26B Sensor 26A is connected to a series input circuit comprised of pulse shaper 80, previously described signal gate 82, and a second shaper circuit 84 (see FIGS. 6a and 6d). Pulse shaper 80 is comprised of an operational amplifier OA11 having a (+) input terminal 5 coupled to the output of sensor 26A, and a (−) input terminal 4 coupled to the positive power supply through a voltage divider comprised of resistors R61, R71 and R81. A signal output is provided at terminal 11. Positive feedback is also provided to (+) input 5 by resistor R11.

Operational amplifier OA11 is so constructed that if the (+) input exceeds the (−) input, the output will be positive but if the (−) input exceeds the (+) input, then the output will be negative.

Thus, referring to waveform 7(a), with a zero signal prior to the first time $t_1$, the input at (−) terminal 4 exceeds that at (+) terminal 5, so the output at terminal 11 is negative. This is reinforced by the positive feedback through resistor R11 which maintains the (+) input below the (−) input.

When the (+) input 5 goes high at time $t_1$, [see waveform 7(a)] the (+) input exceeds the (−) input and output 11 becomes positive. The positive feedback causes the (+) to go further positive, thereby causing output 11 to switch rapidly to its fully positive condition. Amplifier output 11 remains high until the (+) input again falls, which occurs at time $t_0$ as shown by waveform 7(a). At that time output 11 returns to its negative state with positive feedback through resistor R11 assuming rapid transition. The output signal pattern for amplifier OA11 is shown by waveform 7(f).

As shown in FIGS. 6a and 6d, the output of amplifier OA11 is connected by lead 164 and a series RC circuit comprised of resistor R21 and capacitor C31, across a resistor R32 to the (+) input terminal 8 of a second operational amplifier OA12a. The latter is constructed and operates in the same manner as amplifier OA11 described above. An output terminal 12 is coupled through a series resistor R22, a shunt circuit comprised of resistor R42 and diode D12, and stage a of an inverter circuit INV1 as the $t_1$ input to pulse analog circuit 92 as hereinafter explained.

The input to amplifier OA12a, and thus the $t_1$ input to pulse analog circuit 92 depends on signal gate 82, as well as on the C31 – R21 RC circuit.

Thus, as indicated by waveforms 7(a), 7(c), 7(f) and 7(g) prior to time $t_S$, the output of sensor 26A is zero so output 11 of OA11 is negative. Capacitor C31 is charged so the voltage across R32 (FIG. 6d) is zero [see waveform 7(g)] and the output of amplifier OA12a is negative. (In addition, transistor Q11 is on as explained, so the voltage on R32 is zero in any event.)

The negative amplifier output forward biases diode D12 and results in a zero input voltage to stage a of inverter INV1, which, in turn, produces a high output at circuit test point TPI. This is indicated by waveform 7(h).

At time $t_S$ transistor Q11 turns off, but the output of amplifier OA11 is still zero [see waveform 7(f)]. Thus, TPI remains unchanged. However, at time $t_1$ [see waveform (a)] sensor 26A switches to a high level, and the output of the amplifier goes positive as previously described. Capacitor C31 passes the positive transient [see waveform 7(g)] and the (+) input 8 of amplifier OA12a goes high. The resulting positive output across resistor R22 back biases diode D12, and provides a positive input for stage a of inverter INV1. Circuit testpoint TPI goes negative as indicated by waveform 7(h).

As capacitor C31 (FIG. 6a) charges through resistors R21 and R32, voltage across resistor R32 falls from its positive level. When this voltage falls below the level established by resistors R52 and R62 at the (−) input, amplifier OA12a returns to its negative output level. Diode D12 is again forward biased and the output of stage a of INV1 at circuit point TPI again goes positive.

The result, as illustrated in waveform 7(h) is a sharply defined pulse commencing at time $t_1$ and terminating shortly thereafter.

As shown in FIGS. 6b and 6d, the input circuitry for the $t_2$ gauging signal is comprised of signal gate 86 previously described and two pulse shaping circuits 88 and 90, including positive feedback connected amplifiers OA21 and OA12b respectively, like amplifiers OA11 and OA12 previously described. The input to amplifier OA21 is provided at (−) terminal 4 through an RC input circuit including series resistor R91, shunt resistor R101 and shunt capacitor C61 and transistor Q21 in gate 86, with the (+) input provided by voltage divider resistors R111 and R131. The amplifier output 11 is connected over lead 162 through capacitor C42 and R102 to the (+) input of amplifier OA12b (FIG. 6d). The latter, in turn provides an output through resistor R72 across diode D22 and resistor R82 to stage b of inverter INV1. The inverter output at test point TP2 is the $t_2$ input to pulse analog circuit 92, waveform 7(j).

In operation, before time $t_s$, the output of sensor 26 is high, but transistor Q21 is on, so the (−) input to amplifier OA21 is zero. Thus, the (+) input exceeds the (−) input, and output terminal 11 is high. This is shown by waveform 7(i). The high signal level is connected over lead 162 to the input of signal shaper 90, but capacitor C42 is charged and the amplifier input at terminal 6 is zero. Since the (−) input exceeds the (+) input, the output at terminal 2 is negative, and diode D22 is forward biased. This provides a zero input at stage b of inverter INV1, and produces a positive inverter output as shown by waveform 7(j).

At time $t_s$, transistor Q21 turns off, allowing the (−) input of OA21 to exceed the (+) input. Output terminal 11 drops and the resulting negative signal is provided over lead 162 to capacitor C42 (see FIG. 6d) which passes the negative transient to (+) terminal 6 of amplifier OA12b. However, the (−) input already exceeds the (+) input so further reduction to signal level (i.e., from zero to a negative level) has no effect on the output of the amplifier. Thus, the signal at test point TP2 remains unchanged as indicated by waveform 7(j).

At time $t_2$, the output of sensor 26B drops as shown by waveform 7(b). With transistor Q21 off, the (+) input of amplifier OA21 exceeds the (−) input and output terminal 11 rapidly goes positive. The positive output is coupled over lead 162 through capacitor C42 to the (+) input of amplifier OA12b, which now exceeds the (−) input and OA12b switches to provide a positive output across resistor R72. Diode D22 is back biased, and the positive voltage provided at the input of stage b of inverter INV1 produces a negative output at test point TP2 as indicated by waveform 7(j).

As capacitor C42 charges through resistor R102, the voltage across resistor R102 falls sufficiently and the (−) input again exceeds the (+) input, the amplifier output returns to a negative level. Diode D22 is again forward biased and provides a zero input at stage b of INV1 which returns the positive signal level at circuit point TP2. The result is therefore a sharply defined negative pulse commencing at time $t_2$ and terminates shortly thereafter as indicated by waveform 7(j).

In the foregoing description, it is assumed that time $t_1$ occurs prior to time $t_2$, but it should be appreciated that the circuit operation described is unchanged if time $t_2$ occurs first, except that the pulses at circuit test points TP1 and TP2 appear in reverse order. The order of occurrence of the timing pulses serves only to determine th polarity of the pulse width analog waveform as hereinafter described.

TERMINATION OF THE GAUGING INTERVAL

Referring to FIG. 6b, the output of amplifier OA21 is coupled through resistor R141 to delay circuit 130. The latter comprises an RC input circuit including series capacitor C81 and shunt resistor 151, a pair of transistors Q31 and Q41, and an RC output circuit comprised of resistors R221 and R231, and capacitor C111. Prior to time $t_s$, the output of amplifier OA21 in pulse shaper 88 is high, but the DC level is blocked by capacitor C81, and the base of transistor Q31 is at zero voltage. As a result, the transistor is cut off and a positive voltage is coupled from the power supply through resistor R201 to the base of transistor Q41. The latter conducts, tieing capacitor C111 to ground through the transistor. A high signal level is thus maintained at SET input 5 of flip flop FF21 (see FIG. 6e).

At time $t_s$, the output of amplifier OA21 falls [see waveform 7(i)] and a negative pulse is coupled through capacitor C81 to transistor Q31. However, the latter is already biased off so the signal transition has no effect on the transistor operation.

At time $t_2$ the output of amplifier OA21 (FIG. 6b) rises as explained above. The positive signal is coupled through capacitor C81 to the base of transistor Q31 which turns on, cutting off transistor Q41. This produces a positive pulse through capacitor C111 to SET input 5 of flip flop FF21 (FIG. 6c). This responds only to negative going signals, so occurrence of the $t_2$ pulse has no immediate effect on the flip flop. With transistor Q41 cut off, capacitor C111 charges through resistor R231 and the flip flop input voltage ultimately returns to the input level determined by the voltage divider R221 and R231.

At the same time, capacitor C81 charges through resistors R141 and R151 and the voltage at the base of transistor Q31 falls exponentially. After a time depending on pair charging circuit time constant, transistor Q31 cuts off, causing transistor Q41 to turn on and capacitor C111 discharges rapidly through the conductive collector to emitter path of the transistor. The resulting rapid discharge produces a negative going voltage pulse at terminal 5 of flip flop FF21 causing the flip flop to be switched to its SET state and the output voltage at terminal 11 to rise. This reverses biases diode D41 and re-establishes the bias path through resistor R271, diodes D21 and D31 and signal path 160 to turn on transistors Q11 and Q21. Thus, the occurrence of the $t_2$ pulse itself determines the length of the gauging interval. By choosing capacitor C81 and resistors R141 and R151 to establish the desired delay, the duration of the gauging interval may be selected to assure adequate measuring time even if the $t_2$ signal precedes the $t_1$ signal by the longest time possible.

GENERATION OF THE PULSE WIDTH ANALOG SIGNAL

The circuitry for generating the pulse width signals includes pulse width circuit 92, delay circuit 130 previously described, and pulse analog reset circuit 104 shown in FIGS. 6e, 6b and 6a respectively.

Pulse width circuit 92 is comprised of a pair of SET-RESET flip flops FF12 and FF22 like flip flop FF21 previously described connected respectively to a pair of amplifier OA22a and OA22b. Amplifier OA22a is coupled through resistors R132 and R182 and diode R82 to an output resistor R332. The output of amplifier OA22b is also coupled to R332 through resistors R162 and R172 and diode D52.

The order of occurrence and the relative spacing between the signals appearing at test points TP1 and TP2 determine the polarity and duration respectively of the pulse analog signal. As explained hereinafter, at time $t_0$ for a given object, flip flops FF12 and FF22 are placed in the RESET state by a signal from reset circuit 104 applied to the RESET terminals 3 of the flip flops. This makes the outputs of both flip flops low prior to the arrival of the $t_1$ pulse.

Output 11 of flip flop FF12 is connected to the (+) input 8 of amplifier OA22a, the (−) input being provided by the positive power supply through a voltage divider comprised of resistors R112 and R122. The output of flip flop FF22 is connected to the (−) input of amplifier OA22b, the (+) input being provided from the positive power supply through a voltage divider comprised of resistors R192 and R202.

Thus, with flip flops FF12 and FF22 reset, the (+) and (−) inputs respectively of amplifiers OA22a and OA22b are low. For OA22a, the (−) input exceeds the (+) input and the amplifier output is negative while for amplifier OA22b the (+) input exceeds the (−) so the output is positive. Because diodes D82 and D52 are oppositely poled as illustrated, both diodes are back biased when flip flops FF12 and FF22 are reset and a zero voltage appears across output resistor R332.

At time $t_1$, the TP1 waveform 7(h) goes negative, setting flip flop FF12. This produces a positive output at terminal 11, and causes the (+) input of OA22a to exceed the (−) input. The amplifier output goes positive, forward biasing diode D82 and creating a positive current flow to ground through resistor R332. The result is a positive signal level commencing at time $t_1$ at circuit point TP6 as illustrated by waveform 7(k).

At time $t_2$ the TP2 waveform 7(j) goes negative setting flip flop FF22. This produces a high output at flip flop terminal 11. The (−) input to amplifier OA22b exceeds the (+) input, producing a negative signal at terminal 2. This forward biases diode D52, and creates a negative current flow from ground through R332. This is shown by waveform.

Connected in parallel with resistor R332 is a voltage control circuit comprised of oppositely poled zener diodes D32 and D42, and respective shunt resistors R142 and R152. The latter four circuit elements are so chosen that the magnitude of a positive voltage across resistor R332 due to operation of amplifier OA22a is exactly equal to the magnitude of the negative voltage produced by amplifier OA22b. Thus, after both flip flops FF12 and FF22 have been set, the resulting positive and negative signals exactly cancel and the voltage across resistor R332 returns to zero. The resulting positive pulse is shown by waveform 7(m).

As will be appreciated, if the $t_2$ signal occurs prior to the $t_1$ signal, flip flop FF21 will be set before flip flop FF12 and the voltage across resistor R332 will go negative. In that case arrival of the $t_1$ signal will return the voltage across resistor R332 to zero with a resulting pulse shape as illustrated by waveform 7(n). Thus, polarity of the pulse analog signal depends solely on the order of occurrence of the $t_1$ and $t_2$ pulses, while the pulse duration depends solely on the time interval $\Delta t$ between the $t_1$ and $t_2$ pulses.

As mentioned above, flip flops FF12 and FF22 are reset by a signal on lead 166 produced by reset circuit 104 (see FIG. 6a), the latter being comprised of a flip flop FF11 and associated SET and RESET circuits. The SET signal for FF11 is provided by an RC circuit comprising resistor R31 and C41 connected to the output of amplifier OA11. The RESET for flip flop FF11 is provided by the output of delay circuit 130 previously described.

With FF11 reset, the low output on lead 166 maintains flip flops FF12 and FF22 both reset. When flip flop FF11 switches to its SET state, the output at terminal 11 goes high, freeing flip flops FF12 and FF22 for operation in response to the $t_1$ and $t_2$ signals as previously described.

As illustrated in FIGS. 6a and 6b, the RESET input for flip flop FF11 is provided over a lead 168 from the output of gate control circuit 130 previously described. Thus, at the end of the gauging interval, flip flop FF11 is reset and a low level is provided over lead 166 to return flip flops FF12 and FF22 to their low output condition, which, in turn eliminates the current flow through output resistor R332 in pulse analog circuit 92.

A SET signal for flip flop FF11 is provided at terminal 5 by a signal over lead 170 from the series RC circuit comprising capacitor C41 in resistor R31 (see FIG. 6a). Referring to waveform 7(f), the positive going $t_1$ transition at the output of amplifier OA11 has no effect on flip flop FF11 since the latter is switched only by negative going signals. However, the $t_0$ transition for the next object in the sequence causes a negative going signal illustrated by waveform 7(f). This is differentiated by capacitor C41 and resistor R31 to produce the negative pulse which causes flip flop FF11 to be switched to its SET state. This, in turn, conditions pulse analog circuit 92 for measurement of the next object in the sequence, i.e., the one whose leading edge entered the measuring zone, at time $t_0$. As will be understood, pulse analog circuit 92 is cleaned and locked out of operation (until the next time $t_0$) at the end of the gauging interval by the reset signal from FF11.

PULSE WIDTH TO AMPLITUDE CONVERSION

Conversion of the pulse analog signal to the $E_1$ amplitude analog is accomplished by integrator 94, (FIG. 6f) sample and hold circuit 100 (FIG. 6h), pulse sequence detector 96, zero deviation detector (FIG. 6e), sample control circuit 102 and integrator reset 106 (FIG. 6g).

Integrator 94 (FIG. 6f) includes capacitor C172, MOS transistor amplifiers Q22 and Q32, and a summing amplifier OA72. Q22 provides isolation for capacitor C172 while transistor Q32 provides zero input balance and temperature compensation. Summing amplifier OA72 is a (+) and (−) input amplifier like those previously described but with negative feedback provided by potentiometer P22 and resistor R392 rather than positive feedback. An output is provided across resistor R792. The output of transistor Q22 is connected through a resistor R442 to the (−)

input of amplifier OA72 while the output of compensation transistor Q32 is connected through a resistor R362 to the (+) input of OA72. A transistor Q12 is connected in shunt across integrating capacitor C172 to discharge the capacitor at the end of the gauging interval as described below under control of a signal through diode D62.

Assuming that transistor Q12 is non-conducting, capacitor C172 charges through resistor R342 to a level proportional to the width of the $\Delta t$ analog pulse, and with a polarity determined by the order of the $t_1$ and $t_2$ pulses as previously explained. The instantaneous voltage level on capacitor C172 is amplified by transistor Q22 and provided through resistor R442 to summing amplifier OA72. The input for compensating transistor Q32 is determined by voltage divider R352 and P12, the latter being set so the output of transistor Q32 through resistor R362 exactly equals the Q22 output when the integrator input is zero. Since the transistors Q22 and Q32 are connected to opposite inputs of amplifier OA72, the output on resistor R492 for a zero input will be zero.

Also, transistors Q32 and Q22 are preferably closely matched in electrical characteristics so temperature variations will effect both transistors approximately equally to produce offsetting effects at the inputs of amplifier OA72.

The output of integrator 94 is provided as the input to sample and hold circuit 100 (FIG. 6h). The latter comprises a sampling switch transistor Q42 and an RC charge storage circuit comprising resistor R402 and capacitor C262, an isolation MOS transistor Q52, a compensation MOS transistor Q62, and a compensation summing amplifier OA62. Sampling switch transistor Q42 is turned on and off by a bias signal provided through a diode D72 over a lead 174 from sample control circuit 102 as hereinafter described. When transistor Q42 is actuated, the integrator output provided over lead 172 charges capacitor C262 through resistor R402 with the resulting signal level being provided as a gate input to MOS transistor Q52. When sampling transistor Q42 is turned off, the charge stored on capacitor C262 is isolated between resistor R402 and the MOS gate whereby the sample integrator output is held until transistor Q42 is again turned on.

The output of MOS transistor Q52 is connected through an output resistor R592 to the (−) input of amplifier OA62, the (+) input to which is provided from compensating MOS transistor Q62 through resistor R762. MOS transistors Q52 and Q62, and amplifier OA62 operate in the manner described above in connection with transistors Q22 and Q33, and amplifier OA72 respectively to provide the deviation analog signal $E_1$ defined by equation (5) above. As shown in FIG. 6h, the output of amplifier OA62 is provided as one input to analog divider 112, the other input to which is provided by the speed analog signal $E_2$ as hereinafter described.

SAMPLE AND INTEGRATOR RESET CONTROL

From the above discussion, it will be recalled that either gauging pulse $t_1$ or $t_2$ may occur first, or the two gauging pulses may occur simultaneously. Any of these conditions signifies that the deviation analog signal must be sampled since the latter is actually defined as the value of the output of integrator 94 at the moment the second of the two gauging pulses occurs.

Pulse sequence detector 96 and sample control circuit 102 (FIGS. 6e and 6g) cooperate to trigger sampling transistor Q42 upon sequential occurrence of the $t_1$ and $t_2$ signals. Sequence detector 96 comprises an OR gate G12b, a J-K flip flop FF32 and a monostable multivibrator OS12. Inputs to OR gate G12b are provided by the $t_1$ and $t_2$ gauging signals at circuit test points TP1 and TP2. OR gate G12b operates in conventional fashion to provide an output over lead 176 when either the TP1 or the TP2 signal is present. Lead 176 is connected as the clock input of flip flop FF32 to switch the output at terminal 5 from the ONE state to the ZERO state. The output of FF32 is connected to monostable multivibrator OS12 which responds to the negative transition of the flip flop output to produce a high output at terminal 1. The latter is coupled by lead 178 and an input resistor R232 to the (+) input of an amplifier OA42b. This produces a positive pulse on lead 174 to turn on sampling switch transistor Q42. The resulting sampling control signal is represented by waveform 7(o).

If the $t_1$ and $t_2$ signals occur simultaneously OR gate G12b will provide only one output and flip flop FF32 will not be SET. Under these conditions, the flip flop is reset in readiness for the next gauging interval by a signal at terminal 4 from the pulse analog reset circuit 104 just after the end of the gauging interval as previously described.

Sampling is also required when the $t_1$ and $t_2$ gauging signals appear simultaneously, i.e., when the nominal dimensions and actual dimension being measured are equal. This is detected by zero diviation detector 98 comprising AND circuit G12a and a pair of inverter stages $e$ and $f$ of inverter circuit INV1. The TP1 and TP2 signals are coupled through inverter stages $f$ and $e$ respectively to two inputs of AND gate G12a. Whenever the $t_1$ and $t_2$ pulses appear simultaneously as indicated by the concurrence of the TP1 and TP2 signals, AND gate G12a provides an output on lead 178 which is coupled through a second summing resistor R242 to the (+) input of amplifier OA24b in sample control circuit 102. When a zero deviation signal is provided through resistor R242, amplifier OA42b operates as previously described to provide a positive sample control signal to sampling switch transistor Q42.

The output of sequence detector 96 is also provided to integrator reset circuit 106 (FIG. 6g) comprising a monostable multivibrator OS22 and an amplifier OA32. The input for monostable multivibrator OS22 is provided by the ZERO output of monostable multivibrator OS12. Monostable multivibrator OS22 produces a delay beyond that provided by monostable multivibrator OS12, after which amplifier OA32 provides a positive output on lead 182. This signal is coupled through diode D62 (FIG. 6f) to operate transistor Q12. This short circuits integrator capacitor C172. This forces rapid discharge of the capacitor in preparation for the next pulse analog signal.

GENERATION OF THE SPEED ANALOG SIGNAL

The speed analog signal $E_2$ is produced by an integrator circuit coupled to a constant input signal level, and provided with a reset circuit to permit the integrator output to be reset to zero each time one of the object markers 36 passes in proximity to marker sensor 28 (see FIG. 1). The speed integrator circuit (FIG. 6g) is essentially identical to the deviation integrator circuit 94 previously described, and includes an integration capacitor C222, a reset transistor Q92, a buffer MOS amplifier Q82 and a compensation MOS amplifier Q72, and a compensation summer OA42a. However, instead of a signal input such as that provided from pulse analog circuit 92, speed integrator 120 receives its input from a constant power supply level through a pair of series resistors R512 and R522. Thus, the charge on integration capacitor C222 builds toward the power supply voltage but the maximum level depends on the frequency with which reset transistor Q92 is actuated. This, of course, depends on the frequency of the marker pulses so the maximum integrator output is a measure of the conveyor velocity.

The output of integrator 120 is provided over lead 182 to the input of speed sample and hold circuit 122 (see FIG. 6h). The latter is constructed identically to the deviation sample and hold circuit 100 previously described and operates in response to a sample control signal over lead 184 produced by sample control circuit 124. (See FIG. 6b.)

The sample control circuit 124 includes an input diode D131, a differentiator circuit including a capacitor C91 and a resistor R161 and an amplifier OA31. Diode D13 is connected to the output of marker sensor 28 over lead 38. When the marker sensor signal is at its low level prior to the times $t_S$ as indicated by waveform 7(c), diode D131 is forward biased and capacitor C91 blocks the DC signal from resistor R721 keeping the (+) input at terminal 5 of amplifier OA31 at a low level.

The (−) input to amplifier OA31 is provided by the positive power supply through a voltage divider comprised of resistors R181 and R201 which maintain the output of the amplifier at a negative level. This, in turn, maintains sampling transistor Q102 in speed integrator circuit 122 in an inactive condition. When a marker pulse is produced on lead 38, diode D131 is reverse biased and a current path is provided from the positive power supply through resistor R271, capacitor C91 and resistor R16. This provides a positive voltage at (+) terminal 5 of amplifier OA31 which in turn provides a positive output on lead 184 to turn on sampling transistor Q102 in speed sample and hold circuit 122 (see FIG. 6h).

Capacitor C91 charges through resistor R16 ultimately the voltage at terminal 5 of amplifier OA31 to return to a low level. When the voltage at terminal 5 falls below that at terminal 4 (depending on the R721 − R116 − C91 time constant), amplifier OA31 switches back to a negative output which turns off sampling transistor Q102. In this manner, speed sample and hold circuit 122 operates briefly to transfer the voltage level on integrating capacitor C222 at the time that an object marker comes into proximity with the marker sensor 28.

Speed integrator 120 is reset shortly after the sampling interval by a reset signal produced by integration control circuit 118 (see FIG. 6c). Control circuit 118 includes an input RC circuit comprised of capacitor C311 and resistor R711 a positive feedback connected amplifier OA41 and an output diode D11. Control circuit 118 cooperates with selective delay circuit 116 to produce a reset signal for speed integrator 120 just after completion of the active period for the speed sample and hold circuit. As explained in connection with waveform 7(d) the $t_S$ signal is coupled through the output of transistor Q51. This is coupled to the (+) input of amplifier OA41 through a capacitor C211.

The capacitor blocks the normal DC level to maintain a zero voltage at the (+) input of amplifier OA41. Normally, therefore, the (−) input at terminal 4 exceeds the (+) input and the output of the amplifier at terminal 11 is low. Diode D11 is forward biased to provide a current path over lead 184 to the gate of integrator reset transistor Q92. With negative base bias, transistor Q92 is cut off, and integration capacitor C222 charges through resistors R512 and R522 as previously described.

As shown by waveform 7(d) the $t_S$ signal results in a negative going pulse at transistor Q51. This is coupled through capacitor C311 to the (+) input of amplifier OA41, but this only reduces the voltage at the (+) terminal lower in relation to that at (−) terminal 4. Thus at time $t_S$ the output of amplifier OA41 remains negative.

After the $t_S$ pulse, capacitor C311 charges through resistors R711 and R291 in delay circuit 116. At the same time, capacitor C121 is charging from the positive power supply through resistor R301 and R311. The time constant associated with capacitor C311 is chosen to be relatively small in relation to that associated with capacitor C121, so capacitor C311 charges rapidly in relation to capacitor C121. Thus the voltage at terminal 5 of OA41 has returned to zero by the time capacitor C121 has charged sufficiently to cut off transistor Q51. When the transistor does cut off, a positive collector voltage pulse is coupled through capacitor C131 causing the (+) input to amplifier OA41 to exceed the (−) input, and the amplifier output switches to a positive level, back biasing diode D11 and causing the signal on lead 186 to drop to zero as indicated by waveform 7(p). The high signal level on lead 186 causes transistor Q92 in speed integrator 120 to turn on (see FIG. 6g) and to discharge integrating capacitor C222.

Referring back to FIG. 6c, the positive pulse at capacitor C311 causes the capacitor to charge through resistor R711. When the voltage across the capacitor has fallen sufficiently that the (−) input to amplifier OA41 exceeds the (+) input, the amplifier returns to its negative state and diode D11 is forward biased, and the base of discharge transistor 292 is returned to a negative level over lead 186. This causes the transistor to cut off and allows integration capacitor C222 to begin charging again from the positive power supply through resistors 512 and 522.

FAILURE WARNING OPERATION

Referring to FIG. 5, it may be seen that the $E_3$ output of analog divider 112 provides process control inputs for analog to digital conversion unit 144 and deviation limit sensor 146. The latter devices may be of any conventional or desired type, and since these devices do not per se constitute a portion of the present invention, detailed description is not deemed necessary.

Referring now to FIGS. 6– 6j, a failure warning is to be given when the $E_3$ deviation analog signal either is zero for some reason other than $\Delta t = 0$, when $E_3$ exceeds any possible deviation indication for the system or if the $t_2$ gauging pulse does not occur. Thus, the $E_3$ output of analog divider 112 is coupled to threshold and limit circuits 154 and 156 over lead 188 the output of zero deviation detector 98 is provided over lead 190, to threshold circuit 154, and the $t_2$ signal output of pulse shaper 88 is provided over lead 192 to missing pulse detector 150.

Missing pulse detector 150 comprises an input differentiating circuit including capacitor C103 and resistor R513, a timing capacitor C113, an MOS transistor Q183, a zener diode R283 and a pair of amplifier transistors Q193 and Q203. The $t_2$ pulse appearing on lead 192 is differentiated by the input RC circuit, the resulting positive transition causing capacitor C113 to charge to a level sufficient to cause conduction of transistor Q183. This, in turn, causes diode D283 and transistor 193 to conduct. Conduction of transistor Q193 produces a low base voltage for transistor Q203 insufficient for conduction.

However, should a $t_2$ pulse not appear at the approximately expected time for a particular object in the sequence, capacitor C113 will have sufficient time to discharge through resistor R333. Diode D283 and transistor Q193 will cease to conduct and the resulting high voltage causes transistor Q203 to conduct. This serves as an input to the failure warning detector 158 which operates in a manner hereinafter described.

Threshold detector circuit 154 is comprised of a pair of oppositely poled input diodes D193 and D203 connected respectively to the (+) and (−) inputs of a negative feedback connected amplifier OA23. An input to the common point of diodes D193 and D203 is provided by lead 188 from the $E_3$ output of analog divider 112. The output OA23 is provided though a diode D213 to the input of limit sensor 156.

A second input to the (+) terminal of amplifier OA23 is provided from zero deviation inhibit circuit 152. The latter includes an input diode D153, and an input amplifier circuit including transistors Q113 and Q123, a time delay capacitor C63, and an output amplifier transistor Q133.

The $E_3$ signal on lead 188 is also coupled to limit sensor 156. The latter comprises a pair of input resistors R283 and R293. R283 connected through a pair of diodes D223 and D233 to a bias resistor R263 and the collector of a transistor Q143. Input resistor R293 is coupled through diodes D243 and D253 to the base of transistor Q143. Another input to limit sensor 156 is provided from threshold circuit 154 through diode D213 and resistor R273 to bias resistor R263.

The collector of Q143 also provides the input to failure warning alarm circuit 158. This comprises a pair of transistors Q153 and Q163 driving a failure warning indicator. A failure signal is also available through a third transistor Q173. Missing pulse detector 150 also provides an input over lead 200 to failure warning alarm 158 as previously mentioned.

External circuit connections for amplifier OA23 in threshold detector 154 are so adjusted that the amplifier conducts to produce an output if either the (+) or (−) inputs exceeds a predetermined magnitude. When it operates, the output of amplifier OA23 is sufficient to cause diode D213 to conduct and transistor Q153 to become saturated. With transistor Q153 in saturation, transistors Q163 and Q173 are cut off preventing operation of the failure warning alarm. However, if the deviation signal input on lead 188 exceeds some level determined by the circuitry associated with transistor Q143, the latter causes transistor Q153 to cut off. This, in turn, allows transistors Q163 and Q173 to operate to indicate a failure. If the deviation signal on lead 188 exceeds the predetermined limit in the negative direction, diode D223 conducts, and the bias across resistor R263 goes negative. This again causes transistor Q153 to cut off and actuates alarm transistors 163 and 173.

If the signal on lead 188 is zero, the only input to OA23 is provided through Q133 and OA23 does not operate. This allows generation of a failure alarm as explained above. As will be recalled, however, with actual zero deviation, a zero $E_3$ signal is proper, and an alarm should not be given. Thus, when a signal appears on lead 148, transistor Q113 is cut off, and transistor Q123 goes on, and provides gate bias to turn on MOS transistor Q133. This increases the (+) input to OA23 and allows it to operate. Since the zero deviation signal is of short duration, transistor Q123 conducts only briefly. To prevent an unwanted alarm, capacitor C63 retains its charge for a sufficient time for the object under inspection to leave the measuring zone. In the foregoing, there has been described a detailed working embodiment of a non-contact measuring system for a sequence of bottles being manufactured by a high speed production line. However, it should be understood that a variety of alternative products, particularly products which are transparent to the form of energy used to define the measuring zone, may be measured with equal facility. While the system is particularly advantageous for the measurement of transparent objects, it is found that by utilization of the gauging interval technique here disclosed, it is possible to produce accurate measurements of objects on a conveyor not only where velocity variation may be encountered, but where the exact spacing of the objects relative to the sequence of zone markers may also be subject to variations.

An additional advantage of the concept of the present invention resides in measurement of the deviation $D_N - D_A$. Prior techniques involving measurement of full cross sectional dimensions of the object under inspection have provided only limited resolution by timing techniques. By measuring the much smaller time interval $\Delta t$ characterizing the deviation, substantially improved dimensional resolution is achieved.

The invention may be embodied in other specific forms without departing from the spirit of essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of measuring a dimension of an object being carried through a measuring zone on a conveyor comprising: establishing first and second energy beams transverse to the path of motion of said conveyor to define the boundaries of the measuring zone, said beams being so spaced along said path as to be intercepted in order by said object as it passes through said measuring zone; generating a first electrical signal analog of the duration of a first time interval between the interception of the leading edge of said object with said second beam and the interception of the trailing edge of said object with said first beam; generating a second electrical signal analog of the travel time interval required for said conveyor to move a predetermined distance; establishing a gauging interval commencing prior to the beginning of said first time interval and terminating a predetermined time thereafter; inhibiting generation of said first electrical signal analog except during said gauging interval; and processing said first and second signal analogs to generate a third electrical signal analog representative of the ratio of said first time interval and said travel time interval.

2. The method of claim 1 wherein: said step of generating said first signal analog comprises generating a pulse, the pulse width of which is functionally related to the duration of said first time interval, and converting said pulse to a signal, the amplitude of which is functionally related to said pulse width; wherein said step of generating said second signal analog comprises generating a signal, the amplitude of which is functionally related to said travel time interval; and wherein said step of processing said first and second signal analogs comprises dividing said first signal analog by said second signal analog.

3. The method of claim 2 wherein the conversion of said pulse is accomplished by electrically integrating said pulse and measuring the level of the resulting integral upon termination of the pulse.

4. The method of claim 3 wherein said pulse is generated with fixed amplitude and of one polarity if the leading edge of said object intercepts said second beam before the trailing edge of said object intercepts said first beam, and of opposite polarity if the trailing edge of said object intercepts said first beam before the leading edge of said object intercepts said second beam.

5. The method of claim 1 wherein said step of generating said second signal analog comprises: positioning a pair of markers on said conveyor and spaced along said conveyor in the direction of motion thereof by said predetermined distance; sensing the passage of said markers at a predetermined location relative to said measuring zone; generating a continuously growing electrical signal; and sampling and then resetting said signal to zero level whenever one of said markers passes said predetermined location.

6. The method of claim 5 wherein said step of establishing said gauging interval comprises permitting generation of said first signal analog upon passage of one marker at said predetermined location; and preventing generation of said first signal analog from a predetermined time after passage of said one marker until passage of another marker.

7. The method of claim 1 wherein the step of establishing said first and second energy beams comprises generating a pair of light beams of small cross section and impinging said beams on a pair of optical sensors.

8. The method of claim 7 wherein said step of generating a pair of light beams comprises comprising generating a pair of coherent and essentially monochromatic light beams of small cross-section and impinging said beams on said pair of optical sensors.

9. The method of claim 7 wherein said first signal analog is generated in response to variations of the signal outputs of said optical sensors.

10. A method of measuring a dimension of an object being carried through a measuring zone on a conveyor comprising: establishing first and second energy beams at a predetermined spacing transverse to the path of motion of said conveyor to define the boundaries of the measuring zone, said beams being so spaced along said path as to be intercepted in order by said object as it passes through said measuring zone; generating a first electrical signal the amplitude of which is representative of the duration of a first time interval between the interception of the leading edge of said object with the second beam and the interception of the trailing edge of said object with said first beam; generating a second signal, the amplitude of which is representative of the time required for said conveyor to travel a predetermined distance; and dividing said first signal by said second signal to generate a third signal representative of the difference between the measured dimension and the predetermined spacing between said energy beams.

11. The method of claim 10 wherein: said step of generating said first electrical signal comprises generating a pulse, the pulse width of which is representative of the duration of said first time interval, and converting said pulse to said first electrical signal by electrically integrating said pulse and measuring the level of the resulting integral upon termination of the pulse.

12. The method of claim 11 wherein said pulse is generated with fixed amplitude and of one polarity if the leading edge of said object intercepts said second beam before the trailing edge of said object intercepts said first beam, and of opposite polarity if the trailing edge of said object intercepts said first beam before the leading edge of said object intercepts said second beam.

13. The method of claim 10 wherein said step of generating said second signal analog comprises: positioning at least two markers on said conveyor and spaced along said conveyor in the direction of motion thereof by said predetermined distance; sensing the passage of said markers at a predetermined location relative to said measuring zone; generating a continuously growing electrical signal; and sampling and then resetting said signal to zero level whenever one of said markers passes said predetermined location.

14. The method of claim 10 wherein the step of establishing said first and second energy beams comprises generating a pair of light beams of small cross section and impinging said beams on a pair of optical sensors.

15. The method of claim 14 wherein said step of generating a pair of light beams comprises generating a pair of coherent and essentially monochromatic light beams of small cross-section and impinging said beams on said pair of optical sensors.

16. The method of claim 14 wherein said first signal analog is generated in response to variations of the signal outputs of said optical sensors.

17. Non-contact gauging apparatus for measuring a dimension of an object being carried through a measuring zone on a conveyor comprising: energy source means for generating first and second energy beams extending transversely to the direction of conveyor motion and spaced apart along said direction to define the boundaries of the measuring zone; first and second sensors disposed in the path of said energy beams to provide respective first and second output signals in response to impingement of the respective beams thereon; means for supporting said energy source means and said sensors in fixed relation to said conveyor whereby said energy beams will be intercepted and said sensing means occulted in order as said object passes through said measuring zone; third sensor means positioned in fixed relation to said first and second sensors; at least two object markers on said conveyor and spaced along said conveyor in the direction of motion thereof, said third sensor means providing a marker signal when one of said markers passes in proximity to said sensor; first circuit means responsive to said first and second output signals to provide a first analog signal of the duration of a first time interval between the interception of the leading edge of said object with said second energy beam and the interception of the trailing edge of said object with said first energy beam; second circuit means connected to said third sensor means to generate a second signal analog of the time interval between successive marker signals; and third circuit means connected to the output of said first and second circuit means for generating a third signal representative of the difference between the measured dimension of said object and the spacing between said energy beams.

18. Apparatus as defined in claim 17 wherein said first circuit means comprises means for generating a pulse, the pulse width of which is representative of the duration of said first time interval, integrating means coupled to the output of said pulse generating means, and means responsive to the termination of said pulse for measuring the level of the integrator output to provide said first signal analog.

19. Apparatus as defined in claim 18 wherein said pulse generating means generates a pulse of fixed amplitude and of one polarity if the leading edge of said object intercepts said second energy beam before the trailing edge of said object intercepts said first energy beam, and of opposite polarity if the trailing edge of said object intercepts said first energy beam before the leading edge of said object intercepts said second energy beam.

20. Apparatus as defined in claim 17 wherein said second circuit means comprises: signal generating means for generating a continuously growing electrical signal; means responsive to a marker signal for sampling the output of said signal generating means to produce said second signal analog, and means for resetting said signal generating means output to zero level a predetermined time after said output has been sampled.

21. Apparatus according to claim 17 wherein said energy source means comprises optical means for generating a pair of light beams of small cross section and for directing said beams to impinge on said first and second sensors.

22. Apparatus according to claim 21 wherein said optical means comprises a laser.

23. Apparatus as defined in claim 17 further including first and second gating circuits coupling said first and second sensors to said first circuit means, and gate control means coupled to said third sensor and responsive to a marker signal to actuate first and second gate circuits for a predetermined interval.

24. Apparatus as defined in claim 23 further including means coupling the output of said second sensor to said gate control means to turn off said gating circuits a predetermined time after the interception of the leading edge of said object with said second energy beam.

25. Apparatus according to claim 17 wherein said first circuit means comprises a pulse analog circuit including: means connected to said first sensing means and responsive to the interception of the trailing edge of an object with said first energy beam to generate a first intermediate signal of one polarity; means connected to the output of said second sensor and responsive to the interception of the leading edge of said object with said second energy beam to generate a second intermediate signal of polarity opposite to that of first intermediate signal; means for maintaining said first and second intermediate signals at equal but opposite amplitude; and common output means for said first and second intermediate signals to produce a pulse analog signal having a fixed amplitude and of said one polarity if the trailing edge of said object intercepts said first energy beam before the leading edge of said object intercepts said second energy beam, and having opposite polarity if the leading edge of said object intercepts said second energy beam before the trailing edge of said object intercepts said first energy beam, the duration of said pulse analog signal being a function of said first time interval.

26. Apparatus according to claim 25 wherein said first circuit means further comprises integrating means coupled to the output of said pulse analog circuit and means responsive to the termination of said pulse for measuring the level of the integrator output to provide said first signal analog.

27. Apparatus as defined in claim 26 wherein said second circuit comprises a second integrator, means coupling said second integrator to a constant input signal level, means coupled to said third sensor and responsive to a marker signal for sampling the output of said second integrator to produce said second signal analog, and means for resetting said integrator output to a zero level a predetermined time after said output has been sampled.

28. Apparatus according to claim 27 wherein said third circuit means comprises means for generating a third analog signal representative of the ratio of said first and second analog signals.

29. Non-contact gauging apparatus for measuring a dimension of an object being carried through a measuring zone by a conveyor comprising: energy source means for generating first and second energy beams extending transversely to the direction of conveyor motion and spaced apart along said direction to define the boundaries of the measuring zone; first and second sensors disposed in the paths of said energy beams to provide respective first and second output signals in response to impingement of the respective beams thereon; means for supporting said energy source means and said sensors in fixed relation to said conveyor whereby said energy beams will be intercepted and said sensing means occulted in order as said object passes through said measuring zone; third sensor means positioned in fixed relation to said first and second sensors, for providing a third signal representative of the speed of said conveyor; first circuit means responsive to said first and second output signals to provide a first analog signal of the duration of a first time interval between the interception of the leading edge of said object with said second energy beam and the interception of the trailing edge in said object with said first energy beam; second circuit means connected to said third sensor means to generate a second signal analog of a time interval corresponding to a predetermined movement of said conveyor; and third circuit means connected to the output of said first and second circuit means for generating a third signal representative of the dimension of the object under inspection.

30. Apparatus as defined in claim 29 wherein said third circuit means generates said third signal as an analog of the difference between the measured dimension of the object and the spacing between the energy beams.

31. A method of measuring a dimension of an object being carried through a measuring zone on a conveyor comprising: establishing first and second energy beams at a predetermined spacing transverse to the path of motion of said conveyor to define the boundaries of the measuring zone, said beams being so spaced along said path as to be intercepted in order by said object as it passes through said measuring zone; generating a first electrical signal the amplitude of which is representative of the duration of a first time interval between the interception of the leading edge of said object with the second beam and the interception of the trailing edge of said object with said first beam; generating a second signal, the amplitude of which is representative of the time required for said conveyor to travel a predetermined distance; and processing said first and second signals to generate a third signal representative of the dimension of the object under inspection.

32. A method of measuring a dimension $D_A$ of an object being carried through a measuring zone at a velocity $V$ on a conveyor comprising: establishing first and second energy beams transverse to the path of motion of said conveyor at a predetermined spacing $D_N$ along said path of motion to define the boundaries of the measuring zone, said beams being so positioned relative to said path as to be intercepted by said object as it passes through said measuring zone; generating a first electrical signal establishing a time reference ($t = 0$) when the leading edge of the object reaches the upstream end of the measuring zone; generating a signal analog of the time interval $t_1 = (D_A)/(V)$ where $t_1$ is the time required for the trailing edge of said object to reach the upstream end of the measuring zone; generating a signal analog of the time interval $t_2 = (D_N)/(V)$ where $t_2$ is the time required for the leading edge of the object to reach the downstream end of the measuring zone; generating a signal analog of the difference between times $t_1$ and $t_2$; generating a signal analog of a time interval $t_s = D_S/V$, where $t_s$ is the time required for said conveyor to travel a known distance $D_S$; and dividing said $(t_1 - t_2)$ analog signal by said $t_s$ analog signal to generate a signal representative of the dimensional difference $(D_N - D_A)$.

* * * * *

PO-1050
(5/69)

UNITED STATES PATENT OFFICE
CERTIFICATE OF CORRECTION

Patent No. 3,682,554      Dated August 8, 1972

Inventor(s) Lawrence F. Flaczynski

It is certified that error appears in the above-identified patent and that said Letters Patent are hereby corrected as shown below:

In Column 3, line 38, "drawing" should read -- drawings --; line 39, "FIG. 1 and 2" should read -- FIGS. 1 and 2 --. Column 4, line 61, "$t_1 = (D_A)/(V)$" should read -- $t_1 = (D_A)/(V)$ --. Column 6, line 4, delete "be"; line 9, "$E_2=K_2 t_S=(K_2 D_S)/(V)=K_3)/(V)$" should read -- $E_2=K_2 t_S=(K_2 D_S)/(V)=(K_3)/(V)$ -- line 12, "$E_3= (E_1)/(E_2)=(K_1/(K_3)(D_N-D_A)$" should read -- $E_3= (E_1)/(E_2)=(K_1)/(K_3)(D_N-D_A)$ --. Column 7, line 20, "an" should read -- and --; line 50, "=" should read -- = 0 --. Column 8, line 44, "Control" should be cancelled. Column 14, line 4, "th" should read -- the --; line 44, "pair" should read -- the --. Column 15, line 50, after "waveform" insert -- 7(1). -- Column 18, line 35, "diviation" should read -- deviation --. Column 21, line 1, "FIGS, 6-6j" should read -- FIGS. 6i-6j --. Column 24, line 4, (Claim 8), "comprises comprising" should read -- comprises --.

Signed and sealed this 17th day of April 1973.

(SEAL)
Attest:

EDWARD M. FLETCHER, JR.
Attesting Officer

ROBERT GOTTSCHALK
Commissioner of Patents